United States Patent
Chandran et al.

(10) Patent No.: US 12,167,159 B2
(45) Date of Patent: *Dec. 10, 2024

(54) MACHINE LEARNING DRIVEN TELEPROMPTER

(71) Applicant: Microsoft Technology Licensing, LLC, Redmond, WA (US)

(72) Inventors: Chakkaradeep Chinnakonda Chandran, Woodinville, WA (US); Stephanie Lorraine Horn, Bellevue, WA (US); Michael Jay Gilmore, Bothell, WA (US); Tarun Malik, Gurgaon (IN); Sarah Zaki, New Delhi (IN); Tiffany Michelle Smith, Seattle, WA (US); Shivani Gupta, Greater Noida (IN); Pranjal Saxena, Hyderabad (IN); Ridhima Gupta, Gurgaon (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/532,396

(22) Filed: Dec. 7, 2023

(65) Prior Publication Data

US 2024/0114106 A1 Apr. 4, 2024

Related U.S. Application Data

(63) Continuation of application No. 17/579,121, filed on Jan. 19, 2022, now Pat. No. 11,902,690.

(51) Int. Cl.
*H04N 5/222* (2006.01)
*G06F 40/117* (2020.01)
(Continued)

(52) U.S. Cl.
CPC ......... *H04N 5/2222* (2013.01); *G06F 40/117* (2020.01); *G06F 40/169* (2020.01);
(Continued)

(58) Field of Classification Search
CPC ..... G06F 40/117; G06F 40/169; G06V 20/40; G06V 40/18; G10L 15/18; G10L 15/22;
(Continued)

(56) References Cited

U.S. PATENT DOCUMENTS 4,570,232 A * 2/1986 Shikano .................. G10L 15/12
704/241
5,598,557 A * 1/1997 Doner ................. G06F 16/3346
707/999.005

(Continued)

*Primary Examiner* — Michael B. Pierorazio
(74) *Attorney, Agent, or Firm* — NovoTechIP International PLLC

(57) ABSTRACT

Techniques performed by a data processing system for a machine learning driven teleprompter include displaying a teleprompter transcript associated with a presentation on a display of a computing device associated with a presenter; receiving audio content of the presentation including speech of the presenter in which the presenter is reading the teleprompter transcript; analyzing the audio content of the presentation using a first machine learning model to obtain a real-time textual translation of the audio content, the first machine learning model being a natural language processing model trained to receive audio content including speech and to translate the audio content into a textual representation of the speech; analyzing the real-time textual representation and the teleprompter transcript with a second machine learning model to obtain transcript position information; and automatically scrolling the teleprompter transcript on the display of the computing device based on the transcript position information.

20 Claims, 17 Drawing Sheets

(51) Int. Cl.
  *G06F 40/169* (2020.01)
  *G06V 20/40* (2022.01)
  *G06V 40/18* (2022.01)
  *G10L 15/18* (2013.01)
  *G10L 15/22* (2006.01)
  *G10L 25/57* (2013.01)
  *G11B 27/031* (2006.01)

(52) U.S. Cl.
  CPC .............. *G06V 20/40* (2022.01); *G06V 40/18* (2022.01); *G10L 15/18* (2013.01); *G10L 15/22* (2013.01); *G10L 25/57* (2013.01); *G11B 27/031* (2013.01)

(58) Field of Classification Search
  CPC ....... G10L 15/26; G10L 25/57; G11B 27/031; H04N 5/2222
  See application file for complete search history.

(56) References Cited

U.S. PATENT DOCUMENTS

| | | | | |
|---|---|---|---|---|
| 6,085,160 A * | 7/2000 | D'hoore | .................. | G10L 15/005 704/277 |
| 6,098,082 A * | 8/2000 | Gibbon | .................. | G06F 16/739 715/255 |
| 6,442,518 B1 * | 8/2002 | Van Thong | ............. | G10L 15/26 704/235 |
| 6,473,778 B1 * | 10/2002 | Gibbon | .................. | G06F 40/103 715/201 |
| 7,035,468 B2 * | 4/2006 | Yogeshwar | ............. | G06F 16/71 707/E17.031 |
| 7,047,191 B2 * | 5/2006 | Lange | ..................... | G10L 15/26 704/235 |
| 7,065,524 B1 * | 6/2006 | Lee | ........................ | G16H 50/50 706/45 |
| 7,092,888 B1 * | 8/2006 | McCarthy | ........... | G10L 15/1822 704/277 |
| 7,110,664 B2 * | 9/2006 | Yogeshwar | .............. | H04N 5/76 386/328 |
| 7,509,385 B1 * | 3/2009 | Rittmeyer | ............ | G06Q 10/107 715/224 |
| 7,739,253 B1 * | 6/2010 | Yanovsky | ........... | G06F 16/9535 707/706 |
| 7,908,628 B2 * | 3/2011 | Swart | .................. | H04N 21/6377 725/135 |
| 8,131,545 B1 * | 3/2012 | Moreno | .................. | G10L 15/04 704/235 |
| 8,209,724 B2 * | 6/2012 | Rathod | ................ | H04N 21/435 348/715 |
| 8,248,528 B2 * | 8/2012 | Hosking | ................ | H04N 7/165 725/62 |
| 2002/0055950 A1 * | 5/2002 | Witteman | ............... | G06F 16/40 707/E17.009 |
| 2002/0093591 A1 * | 7/2002 | Gong | ................. | H04N 21/2368 348/E7.063 |
| 2003/0025832 A1 * | 2/2003 | Swart | ................ | H04N 21/4828 348/E7.071 |
| 2003/0061028 A1 * | 3/2003 | Dey | ........................ | G06F 16/40 704/9 |
| 2003/0169366 A1 * | 9/2003 | Lenzi | ...................... | H04N 7/10 348/461 |
| 2003/0206717 A1 * | 11/2003 | Yogeshwar | ............ | G11B 27/10 386/328 |
| 2004/0096110 A1 * | 5/2004 | Yogeshwar | ............ | G06F 16/51 707/E17.031 |
| 2005/0227614 A1 * | 10/2005 | Hosking | ................ | H04N 7/165 455/3.06 |
| 2006/0015339 A1 * | 1/2006 | Charlesworth | ....... | G10L 15/187 704/E15.02 |
| 2007/0124147 A1 * | 5/2007 | Gopinath | ................ | G10L 15/19 704/E15.021 |
| 2007/0124788 A1 * | 5/2007 | Wittkoter | ............... | H04N 7/165 348/E7.071 |
| 2008/0066138 A1 * | 3/2008 | Bishop | .................... | G06F 40/58 725/137 |
| 2008/0252780 A1 * | 10/2008 | Polumbus | .............. | H04N 17/00 348/E7.001 |
| 2008/0262996 A1 * | 10/2008 | Yogeshwar | ............ | G06F 16/71 707/E17.031 |
| 2008/0266449 A1 * | 10/2008 | Rathod | .............. | H04N 21/8133 348/E7.001 |
| 2009/0171662 A1 * | 7/2009 | Huang | ................ | G10L 15/1822 704/E15.041 |
| 2010/0257212 A1 * | 10/2010 | Polumbus | ........... | G06F 16/7844 348/468 |
| 2011/0069230 A1 * | 3/2011 | Polumbus | .......... | H04N 21/4884 707/711 |
| 2014/0009677 A1 * | 1/2014 | Homyack | ........... | H04N 21/812 348/468 |
| 2015/0208139 A1 * | 7/2015 | Homyack | ........... | H04N 5/445 348/468 |
| 2021/0103635 A1 * | 4/2021 | Liao | ..................... | G06V 40/174 |

* cited by examiner

FIG. 3B

When you take steps to create an inclusive workplace, the effort can snowball into an overall shift where inclusiveness becomes part of your company's DNA. You'll also minimize potential issues and have a clear plan to resolve any *conflicts that may arise.* Any company that wants to realize the full potential of When you take steps to create an inclusive workplace, the effort can snowball into an overall shift where inclusiveness becomes part of your company's DNA. You'll also minimize potential issues and have a clear plan to resolve any conflicts that may arise. Any company that wants to realize the full potential of

305

< Edit

○ 00:00 / 00:00  ↻  ⏺  ⬛  🎥  🎤  ⋯

Export > into an overall shift where inclusiveness becomes part of your company's

DNA. You'll also minimize potential issues and have a clear plan to resolve

325 — any conflicts that may arise. Any company that wants to realize the full potential of input and feedback across roles and disciplines, facilitate constructive

A⃞ Ã

315

310

Inclusive:

The start of a journey to shift our mindset about inclusive practices.
It offers simple starting points for meaningful changes.

FY21 Inclusive Design Guideline

P.01

Slide 1 of 8

🔍 >   🗔 Views >

FIG. 3F

When you take step Pace: Try varying your pitch and adding emphasis to key words. effort can snowball into an overall shift where inclusiveness becomes part of your company's DNA. You'll also minimize potential issues and have a clear plan to resolve any conflicts that may arise. Any company that wants to realize the full potential of

< Edit

○ 00:13 / 00:13 ↻ ⃝ ⏺ ▤ ▢ ⏵ 🎤 ⋯

Export >

When you take steps to create an inclusive workplace, the effort can snowball into an overall shift where inclusiveness becomes part of your company's DNA. You'll also minimize potential issues and have a clear plan to resolve any conflicts that may arise. Any company that wants to realize the full potential of

A˘ A˜

— 315

310 —

P.01

FY 21 Inclusive Design Guideline

Inclusive:

The start of a journey to shift our mindset about inclusive practices.
It offers simple starting points for meaningful changes.

335 —

ⓥ  Pace
Try varying your pitch and adding emphasis to key words.

▽  🔍  ▤ Views >

FIG. 3H

⌄ Slide 1 of 8 ⌃

MACHINE LEARNING DRIVEN TELEPROMPTER

CROSS-REFERENCE TO RELATED APPLICATION

This application claims the benefit of priority to copending U.S. non-provisional patent application under 35 U.S.C. § 120 to U.S. patent application Ser. No. 17/579,121, filed Jan. 19, 2022, and entitled "Machine Learning Driven Teleprompter," this application also claims the benefit of priority to a provisional patent application under 35 U.S.C. § 119 to India Patent Application Serial Number 202141049126, filed on Oct. 27, 2021, and entitled "Machine Learning Driven Teleprompter," the entirety of which is incorporated by reference herein in its entirety.

BACKGROUND

Presentations for work, school, conventions, or other purposes may be provided in person before an audience and/or before remote audiences. The presenter may rely on a teleprompter when conducting the presentation. However, the current teleprompters offered by various presentation platforms often have limited functionality and may require that the presenter manually scroll through the teleprompter script while reading, which may be unduly distracting while the user is conducting the presentation. Hence, there is a need for improved systems and methods of providing a teleprompter for presentations.

SUMMARY

An example data processing system according to the disclosure may include a processor and a computer-readable medium storing executable instructions. The instructions when executed cause the processor to perform operations including displaying a teleprompter transcript associated with a presentation on a display of a computing device associated with a presenter of the presentation; receiving audio content of the presentation including speech of the presenter in which the presenter is reading the teleprompter transcript; analyzing the audio content of the presentation using a first machine learning model to obtain a real-time textual representation of the audio content, the first machine learning model being a natural language processing model trained to receive audio content including speech and to convert the audio content into a textual representation of the speech in the audio content; analyze the real-time textual representation and the teleprompter transcript with a second machine learning model to obtain transcript position information, the second machine learning model being configured to receive a first textual input and a second textual input and determine a position of the first textual input; and automatically scrolling the teleprompter transcript on the display of the computing device based on the transcript position information on a display of a computing device associated with the presenter.

An example method implemented in a data processing system for by a data processing system for a machine learning driven teleprompter includes displaying a teleprompter transcript associated with a presentation on a display of a computing device associated with a presenter of the presentation; receiving audio content of the presentation including speech of the presenter in which the presenter is reading the teleprompter transcript; analyzing the audio content of the presentation using a first machine learning model to obtain a real-time textual representation of the audio content, the first machine learning model being a natural language processing model trained to receive audio content including speech and to convert the audio content into a textual representation of the speech in the audio content; analyzing the real-time textual representation and the teleprompter transcript with a second machine learning model to obtain transcript position information, the second machine learning model being configured to receive a first textual input and a second textual input and determine a position of the first textual input in; and automatically scrolling the teleprompter transcript on the display of the computing device based on the transcript position information on a display of a computing device associated with the presenter.

An example machine-readable medium on which are stored instructions. The instructions when executed cause a processor of a programmable device to perform functions of displaying a teleprompter transcript associated with a presentation on a display of a computing device associated with a presenter of the presentation; receiving audio content of the presentation including speech of the presenter in which the presenter is reading the teleprompter transcript; analyzing the audio content of the presentation using a first machine learning model to obtain a real-time textual representation of the audio content, the first machine learning model being a natural language processing model trained to receive audio content including speech and to convert the audio content into a textual representation of the speech in the audio content; analyzing the real-time textual representation and the teleprompter transcript with a second machine learning model to obtain transcript position information, the second machine learning model being configured to receive a first textual input and a second textual input and determine a position of the first textual input in; and automatically scrolling the teleprompter transcript on the display of the computing device based on the transcript position information on a display of a computing device associated with the presenter.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 3A, 3B, 3C, 3D, 3E, 3F, 3G, 3H, and 3I show aspects of an example presentation interface that may be implemented by the presentation and communications platform shown in FIGS. 1 and 2.

DETAILED DESCRIPTION

Figure 1:
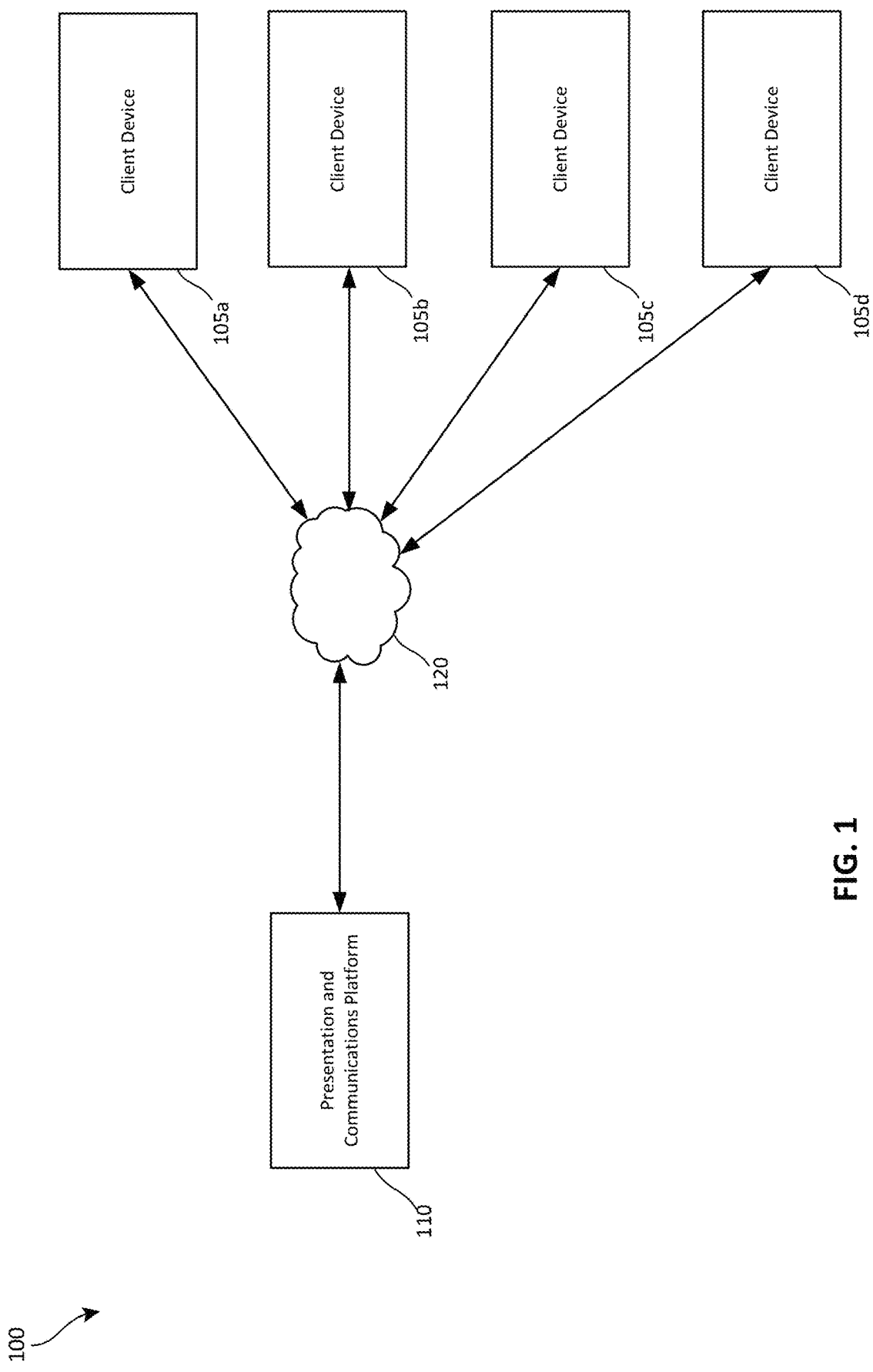
FIG. 1 is a diagram showing an example computing environment in which the techniques disclosed herein for a presentation and communications platform may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for providing a machine learning driven teleprompter for a presentation platform are provided. The teleprompter displays text of a speech or presentation (referred to herein as a "teleprompter script") so that a presenter may read the text word for word to ensure that the presentation is consistent and accurate. The techniques herein provide a technical solution for providing a teleprompter that utilizes one or more machine learning models to analyze the audio content, video content, and/or the teleprompter transcript. The teleprompter of the presentation platform may utilize a machine learning model trained to determine the eye gaze direction of the presenter and reorganize a layout of a presentation interface such that the text of the teleprompter script is displayed proximate to the camera of the computing device of the presenter. A technical benefit of this approach is that it maintains the appearance that the presenter is engaged with the presentation by altering the layout of the user interface of the presentation platform to accommodate the position of the camera associated with the computing device of the presenter. The teleprompter of the presentation platform may also be configured to support highlighting and/or annotation of the teleprompter transcript and to display the marked-up teleprompter script to the presenter during the presentation. The presenter may highlight or otherwise annotate the teleprompter transcript to draw the presenter's attention to portions of the teleprompter transcript that may require additional emphasis during the presentation. The teleprompter techniques provided herein may also include a machine-learning driven scrolling of the teleprompter script during the presentation. The presenter's speech may be analyzed by a voice-to-text natural language processing (NLP) model. The textual output from the NLP model may be analyzed by a scrolling model that compares the textual output with the teleprompter transcript and provides information that may be used by the presentation interface to automatically scroll through the teleprompter script as the presenter progresses through the script. A technical benefit of this approach is that it provides a natural means for controlling the scrolling of the teleprompter script that does not rely on manual scrolling by the presenter or a fixed scrolling rate. The techniques provided herein may also provide automated eye-gaze correction of video content by analyzing the video content with a machine learning model trained analyze video content associated with the presentation and to output eye-gaze corrected video content in which the eye gaze of the presenter is corrected such that the presenter appears to maintain eye contact with the camera of the presenter's computing device. These and other technical benefits of the techniques disclosed herein will be evident from the discussion of the example implementations that follow.

The following terminology is used in the description. A "presentation" as used herein refers to content that is be shared by a presenter with one or more participants. The presentation may be presented to an audience that is present at a location where the presenter is presenting the presentation. A presentation may also be an "online presentation" where participants are located remotely from the presenter and the presentation content is sent to the computing devices of the participants. The presentation content may include a slide show, document, video, images, and/or other content. An online presentation content may also include an audio discussion that accompanies the presentation content. The online presentation may be a standalone online presentation or may be part of an online communications session. A "presenter" as used herein refers to a user of a client device that is sharing an online presentation content with at least one participant and/or presenting the presentation content to participants present at the same location as the presenter. The presenter may be participant of an online communications session with other participants and may assume the role of presenter for at least a portion of the online communications session. A "participant" as used herein refers to a user who is part of the audience of the presentation being shared by the presenter. An online presentation may include multiple participants, and the participants may be located remotely from the presenter. The participants may receive the online presentation content over a network connection at a client device with audiovisual capabilities for outputting the online presentation content to the participants.

FIG. 1 is a diagram showing an example computing environment 100 in which the techniques disclosed herein for a presentation and communications platform may be implemented. The computing environment 100 may include a presentation and communications platform 110. The example computing environment may also include a plurality of client devices, such as client devices 105a, 105b, 105c, and 105d. The client devices 105a, 105b, 105c, and 105d and the presentation and communications platform 110 may communicate via the network 120. Additional details of the presentation and communications platform 110 are discussed in greater detail with respect to FIG. 2.

The presentation and communications platform 110 may be implemented as a cloud-based service or set of services. The presentation and communications platform 110 may be configured to schedule and host online presentations, virtual meetings, video conferences, online collaboration sessions, and/or other online communications sessions in which at least a portion of the participants are located remotely from the presenter. The presentation and communications platform 110 may be used by companies, schools, universities, and other organizations which may traditionally conduct in-person meetings, classes, and/or presentations but must adapt to rapidly changing requirements in which many are working or attending school from home. The presentation and communications platform 110 provides services that enable the presenter to present content to remote participants and/or to facilitate a meeting that includes the remote participants. The presentations and communications platform 110 may also be configured to provide services for presentations that are conducted before a live audience in which the participants are present at the same location as the presenter. The presentations and communications platform 110 may also be configured to support a hybrid approach in which some participants are present at the same location as the presenter while other participants are located remotely and receive the presentation content at their respective client devices, such as the client devices 105a, 105b, 105c, and 105d. The presentation and communications platform 110 may also be configured to support recording of a presentation by the presenter into a video without a live audience. The presenter may then share the video with the applicable audience. The presentation and communications platform 110 may be configured to provide the presenter with means for exporting the video of the presentation into various video formats, including but not limited to the MP4 digital multimedia format. The presentation and communications platform 110 may also support streaming of the video to an audience selected by the presenter. The presenter may share a link to the video of the presentation maintained by the presentation and communications platform 110 that permits the recipients to access the streaming video content of the presentation.

The presentation and communications platform 110 may be implemented by a presentation platform, such as Microsoft PowerPoint Live, which enables a presenter to present a presentation online and to invite users to view the presentation on their own devices. The presentation and communications platform 110 may be implemented by a communications platform, such as Microsoft Teams, which provides an online hub for team collaboration including chat and video conferencing. A presenter may utilize such a communications platform to conduct a meeting, a lecture, conference, or other such event online in which participants may be able to communicate with the presenter as well as other participants via chat and audio and/or video conferencing. In such an online communications platform, a participant may serve as a presenter for part of an online communications session, while another participant may serve as a presenter for another part of the online communications session.

The client devices 105a, 105b, 105c, and 105d are computing devices that may be implemented as a portable electronic device, such as a mobile phone, a tablet computer, a laptop computer, a portable digital assistant device, a portable game console, and/or other such devices. The client devices 105a-105d may also be implemented in computing devices having other form factors, such as a vehicle onboard computing system, a video game console, a desktop computer, and/or other types of computing devices. Each of the client devices 105a-105d may have different capabilities based on the hardware and/or software configuration of the respective client device. While the example implementation illustrated in FIG. 1 includes four client devices, other implementations may include a different number of client devices.

Figure 2:
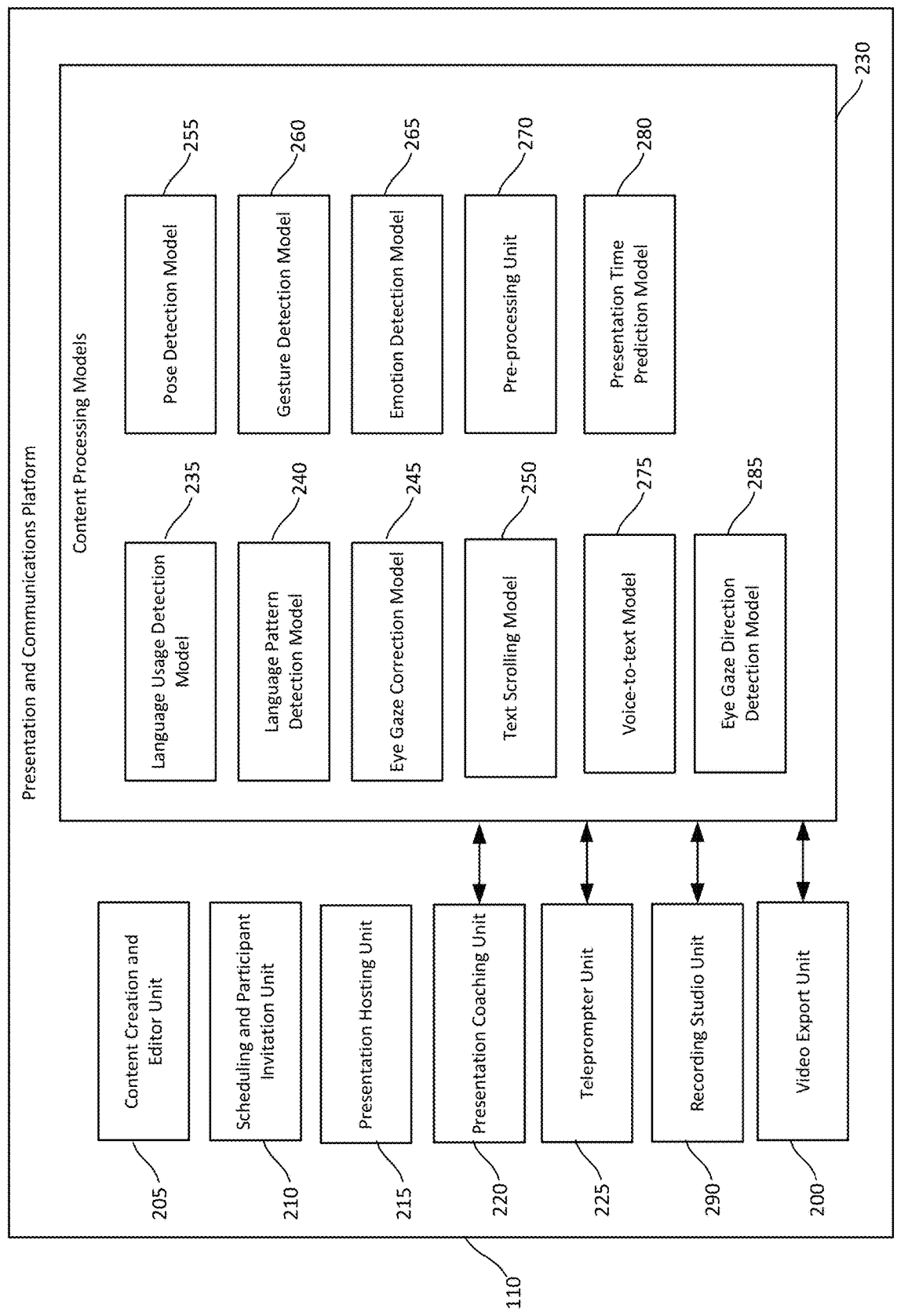
FIG. 2 is a diagram showing additional details of the presentation and communications platform of the computing environment shown in FIG. 1.

FIG. 2 is a diagram showing an example implementation of the presentation and communications platform and client devices of the computing environment 100 shown in FIG. 1. The presentation and communications platform 110 may include a content creation and editor unit 205, a scheduling and participant invitation unit 210, presentation hosting unit 215, a presentation coaching unit 220, a teleprompter unit 225, content processing models 230, a recording studio unit 290, and a video export unit 200. The content processing models 230 include various machine learning models that have been trained to analyze various types of content associated with a presentation and to identify various ways in which the presentation content and/or the presentation skills of the presenter. The content processing models 230 may also be configured to analyze presentation content to provide other types of service, such as but not limited to automated text scrolling of a presentation script for a teleprompter interface and eye direction correction for video content.

The presentation and communications platform 110 includes a hosting element provided by the presentation hosting unit 215 for hosting an online presentation in which at least some of the participants may be located remotely from the presenter. The presentation and communications platform 110 also includes a coaching element providing by the presentation coaching unit 220 which may analyze the presentation provided by the presenter and provide feedback to the presenter for improving various aspects of the presentation. The presentation coaching unit 220 may also be used to rehearse the presentation without an audience to help the presenter hone their presentation skills and improve the presentation content prior to presenting to an audience. The presentation and communications platform 110 may implement a pre-processing unit 270 that includes preprocessing logic that may be configured to analyze the transcript, audio content, video content, or a combination thereof and perform preprocessing on these content to extract high-level feature information in a format that may be received as an input by the various machine learning models of the content processing models 230. A technical benefit of this architecture is that the high-level feature information extracted from the content may be used by more than one of the machine learning models of the content processing models 230. This approach provides a more efficient use of memory and processing resources on the data processing system hosting the presentation and communications platform 110 by eliminating the need to analyze the content separate for each of the models.

The presentation hosting unit 215 may be configured to facilitate hosting of an online presentation by a presenter. The presentation hosting unit 215 may be configured to permit the presenter to share a presentation content with a plurality of participants. The presentation hosting unit 215 may also be configured to facilitate presenting a presentation to a live audience as discussed above. The presentation content, teleprompter script, and/or other content may be visible to the presenter on the client device of the presenter. The presentation content may be displayed to the live audience using via a display screen, a projector, or other means for displaying the presentation content. The teleprompter script may be presented on a display of the client device so that the presenter may refer to the teleprompter script while the presentation content only is shown to the live audience and/or sent to the client devices of the remote participants.

The presentation coaching unit 220 is configured to provide a non-biased and safe environment for presenters to practice and improve their public speaking skills. The presentation coaching unit 220 may also be useful for presenters who do not have anyone available with whom they can practice their presentation. The presentation coaching unit 220 may analyze audio, video, and presentation content with machine learning models trained to identify aspects of the presenter's presentation skills and the presentation content are good and those that may benefit from improvement. The presentation coaching unit 220 may provide feedback critiques on aspects of the presentation skills, such as but not limited to pacing, vocal pattern, volume, whether the presenter is speaking in monotone, and/or language usage. The language usage aspect may include identifying use of filler words, informal speech, slang, euphemisms, culturally sensitive terms, obscene or vulgar language, usage of vocabulary that is unusual or may be confusing or unnecessarily complicated. The presentation coaching unit 220 may also detect when the presenter is being overly wordy. The presentation coaching unit 220 may also detect where the presenter is simply reading text on a slide or other presentation content. The presentation coaching unit 220 may also provide feedback on presentation content, such as the layout of slides or other content and language usage in the slides or other content. The presentation coaching unit 220 may be configured to perform the analysis of the presentation content and/or the presentation skills of the presenter in substantially real time during the presentation or may be configured to perform the analysis of the presentation content and/or the presentation coaching unit 220 may be configured to analyze the presentation content and/or the presentation skills of the presenter after the presentation has been completed. The presentation coaching unit 220 may be configured to annotate the presentation content to identify areas in which the presentation content and/or the presentation skills of the presenter may be improved.

While the example implementation shown in FIG. 2 discusses the use of the techniques disclosed herein with an online presentation, the techniques for providing a teleprompter and/or for providing presentation feedback extended to online communications sessions or online meetings where one participant may at least temporarily assume the role of a presenter by speaking to the other participants of the online communications session about some topic. The presentation and communications platform 110 may analyze the audio and/or video streams captured by the client devices 105 of each of the presenters to automatically generate presentation as discussed above. Furthermore, each of the presenters may have their own teleprompter script or a shared script that is shared among multiple presenters and may be annotated to indicate which presenter should present which part of the presentation transcript.

The content creation and editor unit 205 may provide an application that allows a presenter to create and/or edit content to be presented during a presentation, an online presentation, and/or during an online communications session. The presenter may create the presentation context on their client device 105 or another computing device and import the presentation content to the presentation and communications platform 110 to host the online presentation. The presenter may also create a teleprompter transcript that may be presented on a display of the presenter's computing device during the presentation. Additional functionality associated with the teleprompter script is provided by the teleprompter unit 225, which is discussed in detail below. The content creation and editor unit 205 may provide the presenter with another option for creating and/or editing the presentation content and/or the teleprompter script via a web-based application or via a native application installed on the client device 105a of the presenter. The content creation and editor unit 205 may provide a user interface that may be accessed via the browser application of the client device 105a of the presenter that allows the presenter to create and/or edit the content of the presentation online. The presentation and communications platform 110 may also be configured to store the presentation content and the teleprompter script for the presenter and/or to enable the presenter to store the presentation in a cloud-based file hosting service, such as but not limited to Microsoft OneDrive, Microsoft SharePoint, or other such services.

The client devices 105a, 105b, 105c, and 105d may include a native application developed for use on the client device 105. The native application may be a presentation application that may communicate with the presentation and communications platform 110 to provide a user interface for creating, modifying, participating in, and/or conducting online presentations and teleprompter scripts. The native application may also be a communications platform application, such as but not limited to Microsoft Teams, which may permit a presenter to share an online presentation with participants as part of an online communications session. The native application on the client devices 105a, 105b, 105c, and 105d may be the same application or a different application in some implementations. For example, the presenter may present an online presentation using a first native application while a participant may view and/or participate in the online presentation using a second native application.

The client devices 105a, 105b, 105c, and 105d may include a browser application for accessing and viewing web-based content. The browser applications on the client devices 105a, 105b, 105c, and 105d may be the same application or may be different applications. In some implementation, the presentation and communications platform 110 may provide a web application for conducting and/or participating in an online presentation and/or communication session. The presenter or the participants may access the web application and render a user interface for interacting with the presentation and communications platform 110 in the browser applications. In some implementations, the presentation and communications platform 110 may support both the native application and the web application, and the presenter and participants may choose which approach best suites them and/or their respective client device for conducting and/or participating in a presentation and/or communications session.

The presentation hosting unit 215 of the presentation and communications platform 110 may permit the presenter to schedule an online presentation or communication session in which the online presentation is to be presented. The scheduling and participant invitation unit 210 may provide a user interface that allows the presenter to schedule the online presentation or communication session in which the online presentation is to be presented. The scheduling and participant invitation unit 210 may send invitations to participants to participate in an online presentation. The invitations may include a link to the online presentation and/or a Quick Response (QR) code that the participant may scan to connect to the online presentation or to accept the invitation to participate in the online presentation. The scheduling and participant invitation unit 210 may add a reminder to the calendar of the participants for the date and time for which the online presentation is scheduled.

The teleprompter unit 225 of the presentation and communications platform 110 may be configured to provide various teleprompter services to a presenter including but not limited to: (1) alignment of teleprompter script with camera of the computing device of the user to ensure that the presenter appears to be looking toward the camera, (2)

receiving and displaying transcript annotations, (3) machine-learning driven scrolling that users advanced speech recognition technology to determine which portion of the teleprompter script the users is currently reading and automatically highlighting relevant text and/or scrolling the teleprompter text, (4) machine-learning driven automated eye gaze correction for correcting the eye gaze direction of the presenter in video content and/or video streams associated with the presentation, and (5) presentation content and presentation skill recommendations for improving the presentation content and/or the presenter's presentation skills. The teleprompter unit 225 and/or the presentation coaching unit 220 may be configured to annotate the audio content, video content, and/or the teleprompter script with annotation indications that identify specific improvements that the presenter may make to the presentation content, the presenter's presentation skills, and/or the teleprompter transcript. The annotation indications may be interactive indicators that enable the presenter to obtain more information about the suggested improvements and/or to make automatic edits to the audio content, video content, and/or the teleprompter transcript. The teleprompter unit 225 may assist the presenter in clarifying the language used in the teleprompter transcript, removing potentially offensive or objectionable language from the teleprompter transcript, and/or other edits to the transcript language. The presentation coaching unit 220 may assist the user in editing the audio and/or video content of the presentation, such as but not limited to removing filler words and/or pauses in the presentation. Additional details of the services provided by the teleprompter unit 225 and the presentation coaching unit 220 are described in the examples which follow.

The content processing models 230 may include a language usage detection model 235, a language pattern detection model 240, an eye gaze correction model 245, a text scrolling model 250, a pose detection model 255, a gesture detection model 260, an emotion detection model 265, a voice-to-text model 275, a presentation time prediction model 280, and an eye gaze direction detection model 285. The client device 105 of the presenter may include a microphone for capturing audio content of the presenter and a camera for capturing video content of the presenter. The content processing models 230 may include one or more machine learning models trained to analyze audio-based content, video-based content, or multimodal content. Multimodal content may comprise audiovisual content which has both audio and video components. The content processing models 230 may process the audio content, video content with or without eye gaze correction model applied, the transcript content, or a combination thereof in substantially real time as a presentation is being presented to a live audience or is being recorded for later presentation to an audience. The content associated with the presentation may also be presented in substantially real time during a practice session. The content processing models 230 may also be configured to process recorded content associated with a presentation. The recorded content may be captured by the presenter during a practice session, during a live presentation that includes an audience, or during a pre-recorded presentation that is recorded by the presenter prior to making the presentation content available to other users.

In the example implementation shown in FIG. 2, the content processing models 230 are local to the presentation and communications platform 110. However, at least a portion of the models of the content processing models 230 may be implemented by a remote server or cloud-based services. In such implementations, the presentation and communications platform 110 may be configured to send the feature information expected by the model as an input to the remote server or services and to receive high-level feature information output by the remote model from the server or service. In some implementations the presentation and communications platform 110 may utilize the Microsoft Azure Application Programming Interface (API) for creating an interface between components of the presentation and communications platform 110, such as the presentation coaching unit 220 and the teleprompter unit 225, and one or more remote models. The content processing models 230 may be implemented using various machine learning architectures such as deep neural networks (DNNs), recurrent neural networks (RNNs), convolutional neural networks (CNNs), and/or other types of neural networks. The particular architecture selected for a model may be based on the type of analysis to be performed by the model. In some implementations, the models may be custom developed for a analyzing a particular aspect of a presentation. For example, a model may be trained to detect specific gestures that presenter of an online presentation and/or communication session are expected to perform. Other models may be a more general-purpose model that is used to analyze a particular input and is not specifically tailored for use for analyzing content associated with online presentations. For example, a model for identifying language usage issues, such as obscenity or vulgar language may be a general-purpose model for identifying such language in audio or video content.

The language usage detection model 235 may be configured to analyze features extracted from video content of the presenter to identify language usage and to output high-level features information that represents the language usage. The presentation coaching unit 220 and/or the teleprompter unit 225 may be configured to identify certain language usage of a presenter during a presentation or rehearsal that may detract from the presentation. For example, the presentation coaching unit 220 and/or the teleprompter unit 225 may be configured to identify the usage of obscenities or vulgar language, slang, filler words, difficult words, and/or other language usage that the presenter should avoid. The presentation coaching unit 220 and/or the teleprompter unit 225 may provide suggestions for alternative language and/or language to be avoided during a presentation. These suggestions may be included in the summary report or reports that may be provided to the presenter at the end of the presentation.

The language pattern detection model 240 may be configured to analyze features extracted from video content of the presenter to output high-level features information that identifies the language pattern issues in the presentation. The language pattern detection model 240 may be trained to identify issues such as pacing, volume, pauses, and/or other issues related to the speech pattern of the presenter. For example, the language pattern detection model 240 may detect that the presenter may be speaking to quickly or too slowly, may be speaking too quietly or too loudly, or may be pausing too often or for too long during the presentation. The presentation coaching unit 220 and/or the teleprompter unit 225 may provide suggestions for improving the pacing, volume, and/or other aspects of the language patterns used by the presenter during the presentation. These suggestions may be included in the summary report or reports that may be provided to the presenter at the end of the presentation.

The eye gaze correction model 245 may be configured to receive video input of the presentation and to output eye-gaze corrected video content. The eye gaze correction model 245 may analyze video of the presentation in substantially real time to provide eye-gaze corrected video during a presentation with a live audience. The eye gaze correction model 245 may alternatively be used to analyze a recording of the presentation that has been captured either with or without an audience. The eye gaze correction model may be used to adjust the direction of the eye gaze of the presenter in the video where the presenter does not appear to be looking directly at the camera. The presenter may be distracted or nervous and look away from the camera during the presentation. This may be distracting to viewers and may appear that the presenter is not engaged with the audience. The eye gaze model may be trained to analyze video content and of the presenter and to correct the eye gaze so that it appears that the presenter maintains eye contact with the camera throughout the presentation. The eye gaze correction model 245 may analyze video of the presentation in substantially real time to provide eye-gaze corrected video during a presentation with a live audience and/or during a recording of the presentation without live audience. The eye-gaze corrected video content may be presented on a screen to a live audience and/or streamed to the client devices of remote participants. The eye-gaze corrected video content may also be generated by analyzing the video of a presentation after the presentation has been completed. The eye-gaze corrected video content may be presented during the presentation to the local and/or remote participants. The eye-gaze corrected video content may also be recorded by the presentation and communications platform 110, and the eye-gaze corrected video content may be presented to viewers who access the stored presentation content. Furthermore, the presentation and communications platform 110 may retain the original, unaltered video content of the presentation. The presenter may refer back to and/or revert back to the unaltered video content of the presentation.

The eye gaze direction detection model 285 may be configured to receive video input of the presentation and to output eye gaze direction information. The eye gaze direction detection model 285 may be used to output a prediction of a direction where the presenter of a presentation is looking relative to the camera of the client device 105. The teleprompter unit 225 may use this information to reorganize the layout of the presentation interface so that the teleprompter text is proximate to the camera on a display of the client device of the presenter so that the presenter appears to be making eye contact with the camera rather than looking away to read the text of the teleprompter script.

Figure 6:
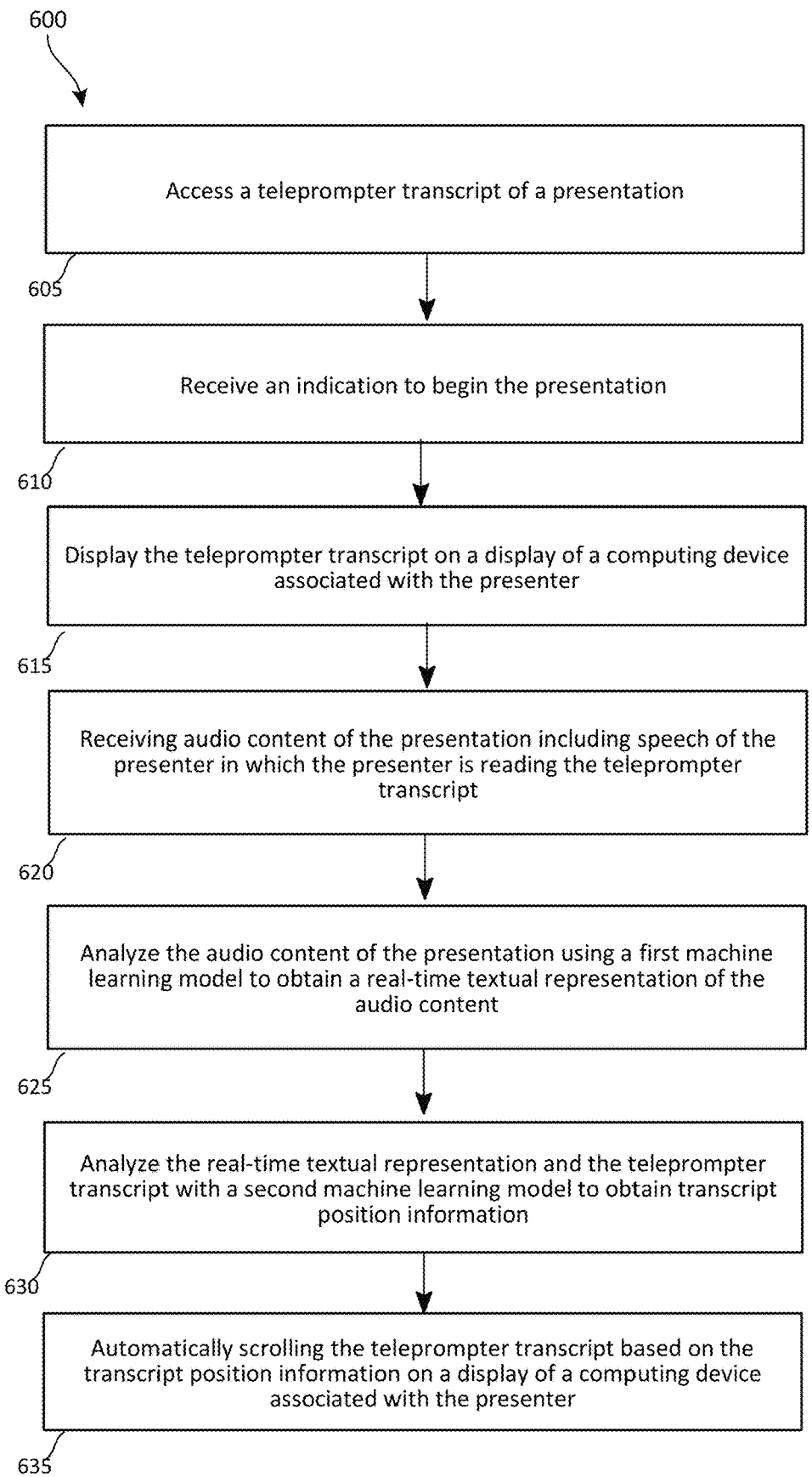
FIG. 6 is a flow diagram of another example process 600 for operating a teleprompter on a presentation platform.

The text scrolling model 250 may be configured to receive a real-time textual representation of the speech of the presentation and the teleprompter transcript as input and to output a current position within the teleprompter transcript that the presenter is currently reading. The text scrolling model 250 may output a character position or word position within the teleprompter script that indicates where the presenter is currently predicted to be reading. If the text scrolling model 250 cannot find a match, the model may output the last position where the presenter was predicted to be reading. FIG. 6 provides an example process for automatically scrolling the teleprompter text which may use the text scrolling model 250.

The pose detection model 255 may be configured to analyze features extracted from video content of the presenter to identify a pose of presenter and to output high-level features information that represents the identified pose. The model may determine that the person is standing, sitting upright, slouched down, or some other position. The pose information may be indicative of engagement of a presenter or may be indicative of behavior that may be distracting. For example, if the presenter is slouched down during the presentation, they may appear to be disinterested to the participants, and if the participant is slouched down, the participant may be bored or confused by the presentation content. The presentation coaching unit 220 and/or the teleprompter unit 225 may be configured to analyze the high-level features obtained from the pose detection model 255 to identify a pose of the presenter during a presentation or a rehearsal that may be distracting to the audience and may provide suggestions to the presenter for eliminating such poses.

The gesture detection model 260 may be configured to analyze features extracted from video content of the presenter to identify a gesture made by the presenter and to output high-level features information that represents the identified gesture. The gesture information may be output as high-level features and analyzed by the presentation coaching unit 220 and/or the teleprompter unit 225 to identify gestures that may be distracting to the audience and may provide suggestions to the presented for eliminating such gestures. For example, the presenter may unconsciously touch their face or cover their mouth with their hand while presenting. Such behavior may be distracting to the audience, and the presentation coach may provide an indication to the presenter that the gesture should be avoided. In some implementations, the presentation interface may annotate the video content with annotation indicators as indicated above, and the presenter may be provided with tools to that allow the user to clip the video content that includes the potentially distracting gestures. The audio portion of the clipped content may be preserved and displayed with the presentation content but an inset of the video of the presenter may be temporarily hidden by presentation content to avoid showing the potentially distracting gesture or behaviors by the presenter.

The emotion detection model 265 may be configured to analyze features extracted from video content of the presenter to identify an emotional state of the presenter and to output high-level features information that represents the identified emotional state. The emotion information may be output as high-level feature and provided as an input to the presentation coaching unit 220 and/or the teleprompter unit 225. The presentation coaching unit 220 and/or the teleprompter unit 225 may be configured to identify certain emotional states of the presenter, and this information may be used by the presentation coaching unit 220 and/or the teleprompter unit 225 to provide suggestions to the presenter if the presenter appears to be unhappy, anxious, angry, stressed, or exhibit other emotions that may distract from the presentation or otherwise impact the presenter's performance. The presentation coaching unit 220 and/or the teleprompter unit 225 may provide suggestions to the presenter for dealing with stress or anxiety related to public speaking. These suggestions may include techniques for dealing with stress or anxiety related to public speaking.

The voice-to-text model 275 may be implemented by a natural language processing model that is configured to analyze the speech included in an audio and/or video content and to output a translation of the speech into text. The voice-to-text model 275 may be configured to receive the audio and/or video content and to output the textual translation of the speech in substantially real time.

The presentation time prediction model 280 may be configured to analyze the audio content and/or video content captured over time by the presentation and communications platform 110 to provide predictions of how long a particular presenter may take to read a particular teleprompter transcript. The presentation time prediction model 280 may be configured to analyze the audio content and/or video content captured by the client device 105 of the presenter to identify the characteristics of the presenter's speech, such as but not limited to speech patterns, speed, and pitch. The presentation time prediction model 280 may continue to analyze the audio content and/or video content for practice sessions and/or presentations conducted using the presentation time prediction model 280 to further refine the predictions regarding how long a particular presenter may take to present a particular teleprompter script.

The presentation time prediction model 280 may be provided a teleprompter transcript associated with a particular presenter by the teleprompter unit 225. The teleprompter unit 225 may be configured to automatically request a prediction for a particular presenter responsive to the presenter accessing the teleprompter content in the presentation interface of the presentation and communications platform 110. Examples of the presentation interface are shown in FIGS. 3A-3I, which are described in detail in the examples which follow. The presentation interface may present the prediction to the presenter in response to the user accessing and/or editing the teleprompter transcript.

The recording studio unit 290 may be configured to support recording of a presentation by the presenter into a video without a live audience. Instead, the video of the presentation may be made available to the audience after the video of the presentation has been recorded by the presenter. The computing device 105 of the presenter may capture the video of the presenter and process the video using the content processing models 230 as may be done for live presentations. The recording studio unit 290 may store the video in a persistent memory of the presentation and communications platform 110. The video may include various edits performed by the content processing models 230 described herein, such as eye correction, the editing out of distracting or potentially offensive content, and/or other types of edits that may be automatically performed by the content processing models 230. The recording studio unit 290 may automatically annotate the recording of the video and/or the transcript as discussed in the preceding examples and provide an opportunity for the presenter to apply each of the changes suggested in response to the recording of the video being processed by the content processing models 230. The recording studio unit 290 may retain an original version of the video that may be viewed by the presenter and/or provide means for making the original video available to the audience members instead of the version produced by the content processing models 230 if the presenter is unhappy with the edits made by the recording studio unit 290.

The video export unit 200 provides means for the presenter to share the video of the presentation with an intended audience once the recording has been completed. The recording studio unit 290 may be configured to provide a user interface that provides the presenter with means for exporting the video of the presentation into various video formats, including but not limited to the MP4 digital multimedia format. The recording studio unit 290 may also support streaming of the video to an audience selected by the presenter. The presenter may share a link to the video of the presentation maintained by the presentation and communications platform 110 that permits the recipients to access the streaming video content of the presentation. The link may be communicated to the respective client devices 105 of the audience members as an email, text message, or other type of message that indicates to the recipient that they are invited to view the recorded presentation. The recording studio unit 290 may be configured to access the recording of the presentation associated with the link and to stream the recording to the client device 105 of the user who activated the link. The presenter may also provide a link which allows the user to download the recorded video to their respective client device 105 for viewing.

Figure 3A:
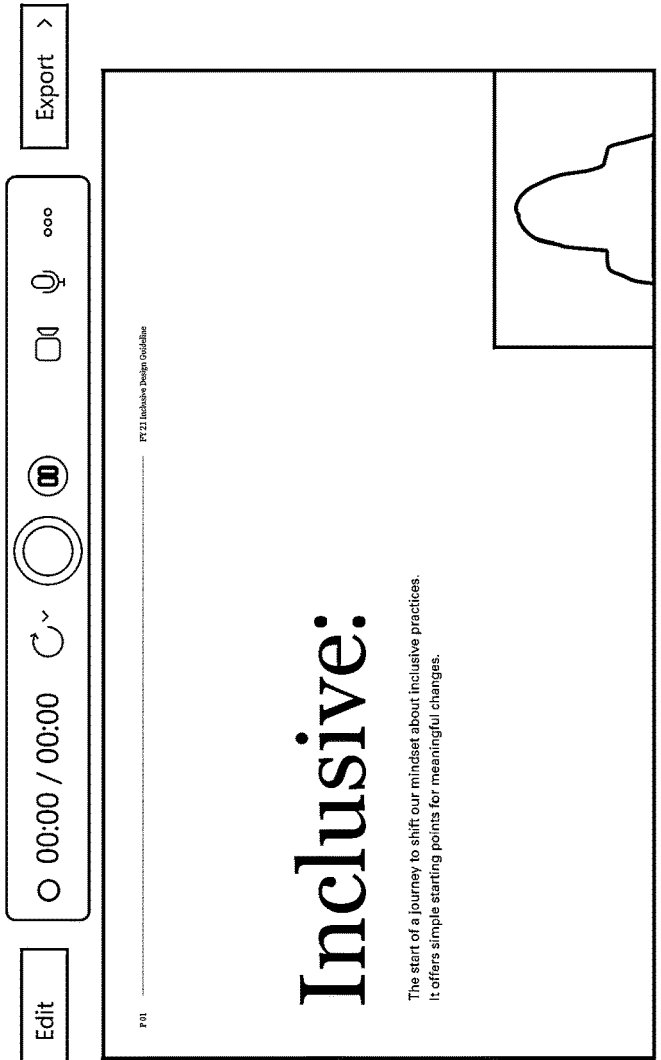

The teleprompter unit 225 may also be configured to automatically reorganize the layout of the user interface of a presentation application provided by the presentation and communications platform 110. FIG. 3A shows an example of a user interface of a presentation application. The presentation interface shown in FIG. 3A includes presentation controls 305, which may provide means for the presenter to control various functions of the presentation application, such as but not limited to controls for beginning a presentation, recording a presentation, turning the microphone and/or camera of the presenter's client device 105 on or off, and/or functions of the presentation application. The specific controls that are included in the presentation controls 305 may vary based on the version and/or type of presentation application. The specific controls that are shown may also be configurable, at least in part, based on user preference settings. The presentation interface may also include a presentation content pane 310, which may provide a view of the presentation slides and/or other content that is provided to the client devices 105 of the remote participants and projected or otherwise displayed for an audience that is present at a location where the presenter is presenting the presentation. The presentation content pane 310 may also include an inset pane (shown in the bottom right corner of the presentation content pane 310) that provides a view of the presenter. The inset pane may show video of the presenter captured by the client device 105 of the presenter as they present the presentation. The contents of the presentation content pane 310 may be recorded during the presentation to permit later viewing of the presentation.

The presentation application may also present the teleprompter transcript 315 on the user interface. In the example layout shown in FIG. 3A, the teleprompter transcript 315 is shown in a first position located at the bottom of the user interface. The presentation application user interface may provide tools that permit the contents of the teleprompter script 315 and/or the presentation content shown in the presentation content pane 310 to be edited. The transcript contents may also be highlighted or otherwise marked up by the presenter. The presentation controls 305 and the teleprompter transcript 315 are not shown to the audience and/or remote participants to the presentation. The contents of the presentation content pane 310 are the content that is shown to the audience and/or remote participants to the presentation.

The presentation user interface may include an "editing mode" and a "presentation mode." In the editing mode, the contents of the user interface may be presented in a first layout, such as that shown in FIG. 3A. In the presentation mode, the contents of the user interface may be presented in a second layout, such as that shown in FIG. 3B. The second layout may automatically position the teleprompter script 315 proximate to a location of a camera of the client device of the presenter.

FIG. 3A is in an example of a user interface of a presentation application that may be implemented by the presentation and communications platform 110. The presentation and communications platform 110 may cause the user interface to be displayed on the client device 105 of the client device of the presenter. In some implementations, the presentation and communications platform 110 may provide the presentation user interface as web-based content that may be rendered by a web browser or other application capable of rendering web-based content on the client device 105 of the presenter. In other implementations, the client device 105 of the presenter may include a native application associated with the presentation and communications platform 110 that is configured to communicate with the presentation and communications platform 110 to obtain various services from the presentation and communications platform 110, such as but not limited to scheduling presentations, inviting participants to presentations, storing presentation content and/or teleprompter scripts, and providing means for communicating with and sharing content for online presentations with the client devices of participants to the presentation.

Figure 3B:
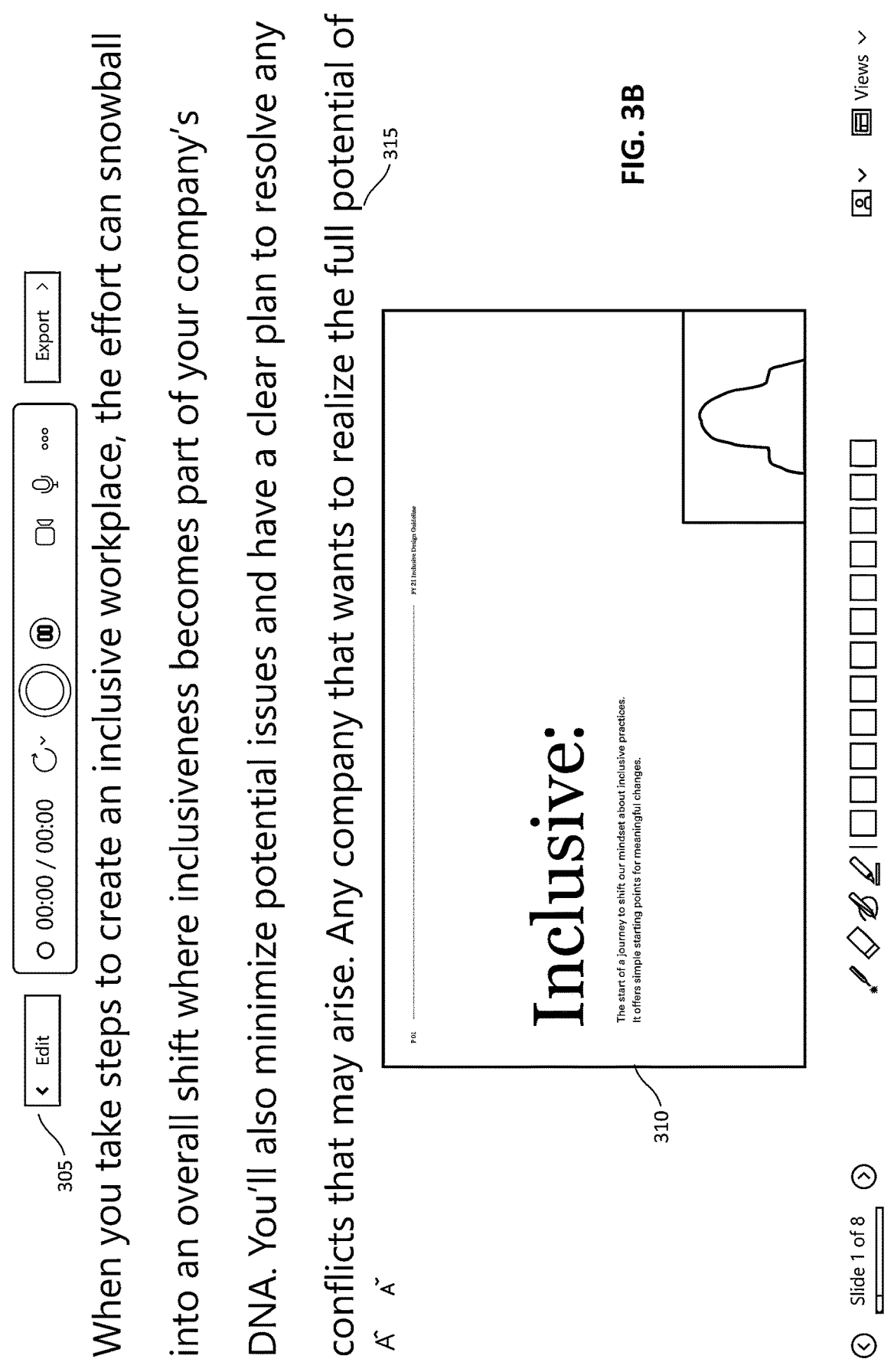

FIG. 3B is an example of the user interface from FIG. 3A in which the presentation application has automatically reorganized the layout of the user interface such that the teleprompter script 315 is proximate to the location of the camera. As discussed above, the teleprompter unit 225 may be configured to reorganize the layout of the presentation interface so that the teleprompter script appears as close as possible to the camera associated with the client device 105 of the presenter. In some implementations, the location of the camera may be at a predetermined location, such as at the top center of the display of the computing device. The predetermined location may be determined based on a type of client device 105 which the presenter is using to capture the presentation. In other implementations, the location of the camera may not be predetermined. However, a location of the camera relative to the teleprompter script may be determined based on the eye gaze direction of the presenter. The teleprompter unit 225 may automatically reconfigure the layout of the presentation interface to position the teleprompter script 315 as close as possible to the camera associated with the client device 105 of the presenter so that the eye gaze of the presenter appears to be centered on the camera if possible. This approach may be combined with the eye-gaze correction techniques described herein to center the eye gaze of the presenter on the camera of the client device 105.

Figure 4:
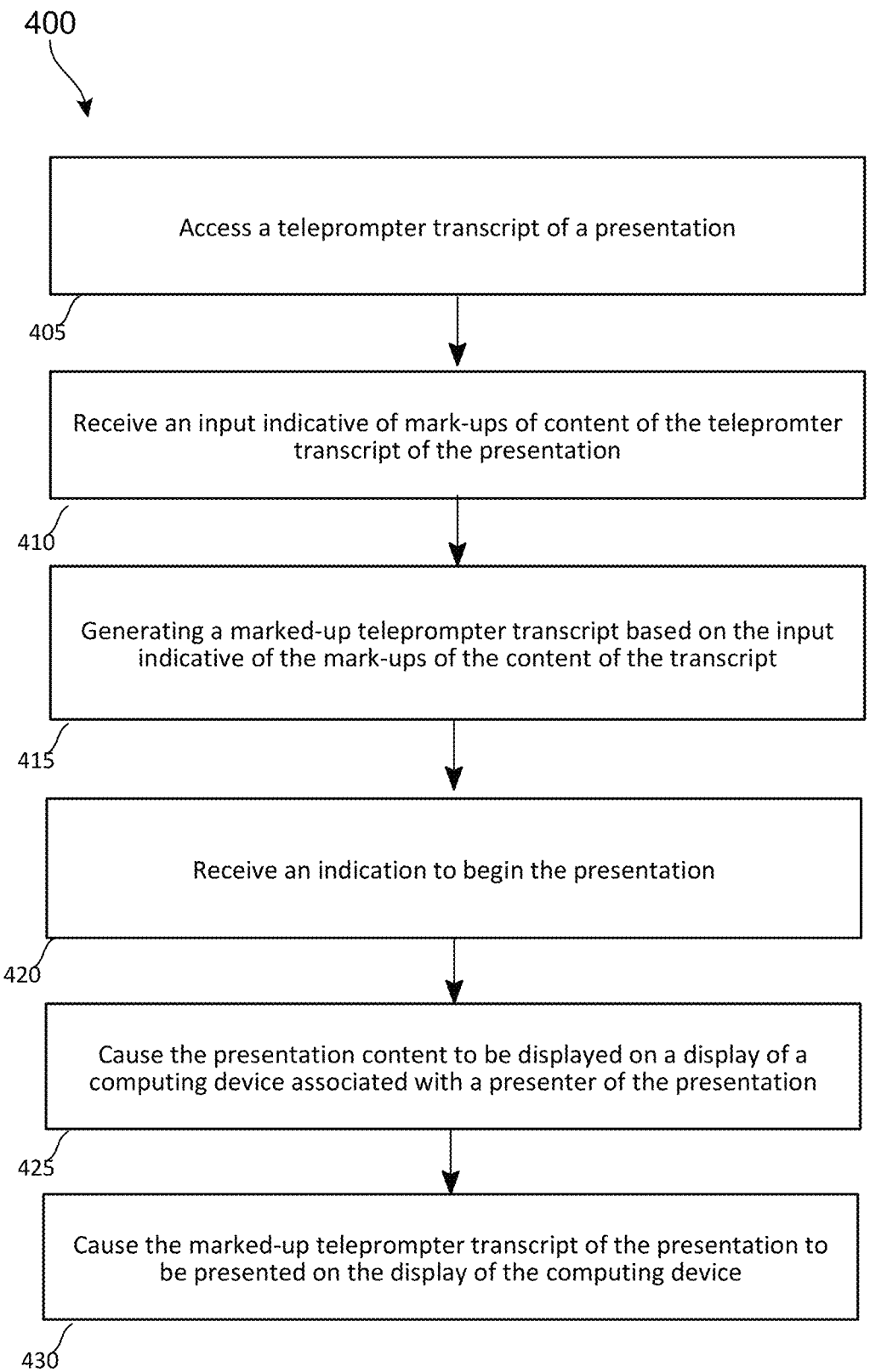
FIG. 4 is a flow diagram of an example process 400 for operating a teleprompter on a presentation platform.

FIG. 4 is a flow diagram of an example process 400 for operating a teleprompter on a presentation platform, such as the presentation and communications platform 110. The process 400 may be implemented by the teleprompter unit 225 of the presentation and communications platform 110. The example process shown in FIG. 4 may be combined with one or more of the processes shown in FIGS. 5-8. These processes have been shown separately for clarity.

The process 400 may include an operation 405 of receiving a teleprompter transcript 315 of a presentation. The teleprompter transcript 315 may be stored in an electronic document created using a text editor or document editor external to the presentation and communications platform 110. The presentation user interface of the presentation and communications platform 110 may be configured to provide a file selection menu or other user interface tools that enables the presenter to load The teleprompter transcript 315 may also be entered via a presentation user interface of the presentation and communications platform 110. In some implementations, the presentation user interface may support dictation of the transcript, and the presentation and communications platform 110 may analyze the speech of the presenter using a natural language processing model configured to convert spoken language into text. The presentation content and the teleprompter script may be displayed to the presenter as shown in FIGS. 3A-3I.

Figure 3C:
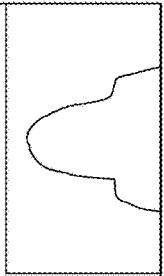

The process 400 may include an operation 410 of receiving an input indicative of mark-up of content of the teleprompter transcript of the presentation. The presentation user interface of the presentation and communications platform 110 may be configured to may be configured to provide tools that enable the presenter to highlight text of the teleprompter transcript, change the font and/or font size of sections of the teleprompter transcript, select bold text and/or italicized text, and/or otherwise highlight words within the transcript. The presenter may wish to highlight certain words to indicate that these words should be emphasized in some way as the presenter is reading the teleprompter transcript. Current teleprompters do not provide such a feature and instead present plain text context to the presenter. FIG. 3C shows an example implementation of the presentation user interface that shows a text editor popup 320 being used to highlight a portion of the teleprompter transcript. In some implementations, the text editor popup 320 may be displayed in response to the user selecting a portion of the text of the teleprompter script 315 using a mouse, touchscreen, or other user interface features of the client device 105 of the presenter. The example shown in FIG. 3C shows just a portion of a teleprompter transcript. However, the presentation user interface may be configured to provide a scrollbar or other means for the user to browse through the transcript if the portion of the teleprompter transcript exceed the area allocated for viewing the transcript content. In some implementations, the teleprompter transcript for a presentation may also be broken up in to segments and each segment may be associated with a particular slide. The presentation user interface may include user interface elements that enable the user to move from slide to slide of the presentation and to annotate each segment of the teleprompter text associated with the presentation.

The process 400 may include an operation 415 of generating a marked-up version of the teleprompter transcript based on the input received. The teleprompter unit 225 may be configured to add markup information to a copy of the teleprompter script. In some implementations, the markup may be added to the teleprompter script 315 as metadata that identifies the markup that has been added by the presenter. The teleprompter unit 225 may maintain a clean, unmarked up copy of the teleprompter script 315 in some implementations and create a separate file that includes the marked-up version of the teleprompter unit 225. The teleprompter script and/or the marked-up teleprompter script may be stored in a persistent memory associated with the presentation and communications platform 110 and/or on the client device 105 of the presenter. The presentation and communications platform 110 may store a copy of the presentation content and the teleprompter script in storage allocated to an account associated with the presenter. In some implementations, the presentation content and/or the teleprompter script may be stored by a separate cloud-based file storage and management platform which is accessible by the presentation and communications platform 110.

The process 400 may include an operation 420 of receiving an indication to begin the presentation. The presentation user interface of the presentation and communications platform 110 may provide a button, menu selection, or other means for the user to initiate the presentation. If the presentation includes a local audience, the presentation content on a display be displayed to the live audience using via a display screen, a projector, or other means for displaying the presentation content. If the presentation includes remote participants, the presentation content may be transmitted to the respective client devices 105 of the participants via one or more media streams. Audio and/or video content of the presenter may be captured by the client device 105 of the presenter and streamed to the presentation and communications platform 110, and the presentation and communications platform 110 may then transmit one or more media streams including the presentation content and the audiovisual content of the presenter to the respective client devices 105 of the remote participants.

The process 400 may include an operation 425 of causing the presentation content to be displayed on a display of a computing device associated with the presenter of the presentation. The presentation content may be shown in the presentation content pane 310 as shown in FIGS. 3A-3I.

Figure 3D:
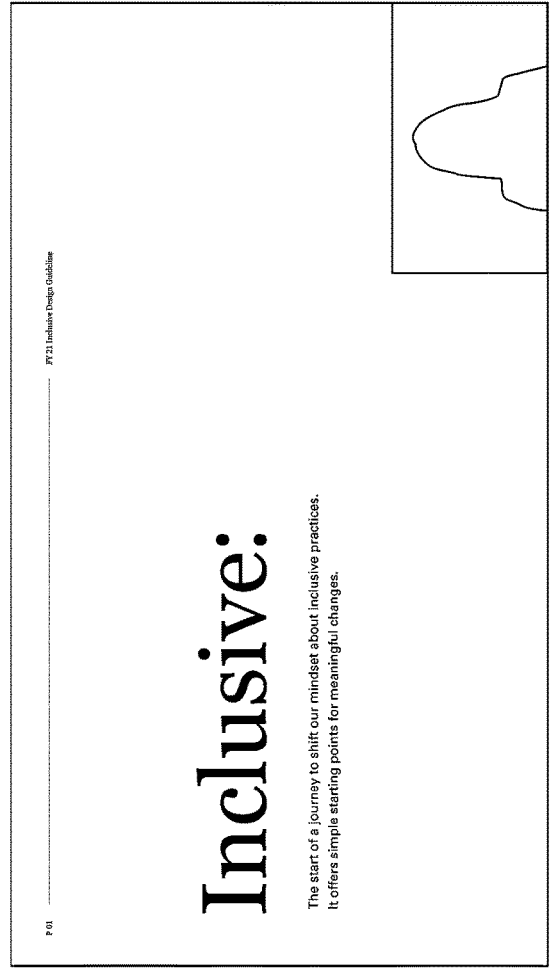

The process 400 may include an operation 430 of causing the marked-up teleprompter transcript of the presentation to be presented on a display of the computing device. The teleprompter unit 225 may present the marked-up copy of the teleprompter script to the presenter on the presentation interface. FIG. 3D shows the presentation user interface in which the marked-up version of the transcript that was created in operation 415 is displayed on the presenter along with the presentation contents in the presentation content pane 310. The teleprompter script 315 is also centered at the top of user interface during the presentation so that the present appears to be making eye contact with the camera of the client device 105 while presenting. As discussed in the preceding examples, the layout of the presentation user interface may automatically be reconfigured based on the location of the camera of the client device of the presenter so that the presenter's eye gaze appears to be directed to the camera.

Figure 5:
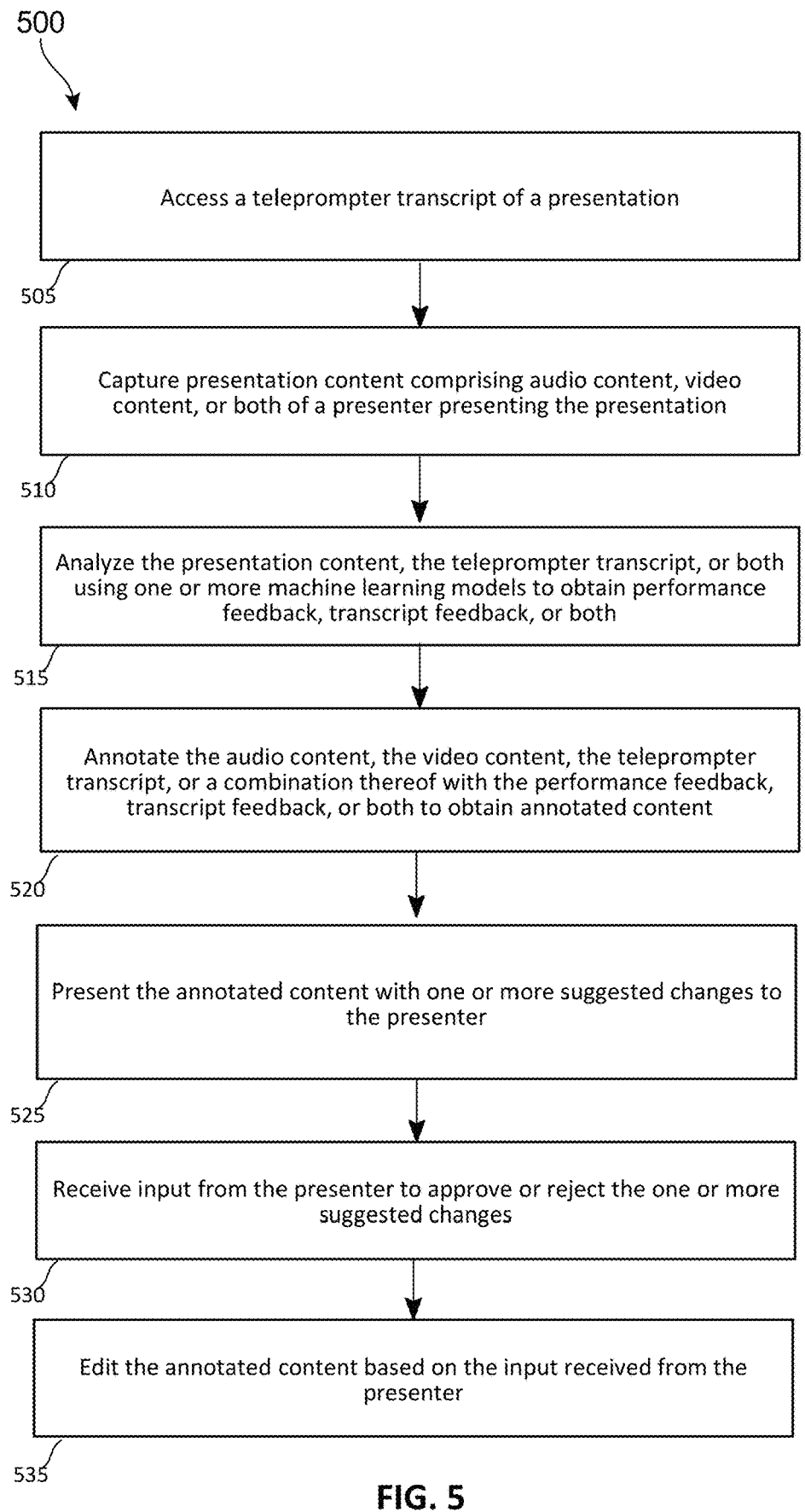
FIG. 5 is a flow diagram of another example process 500 for operating a teleprompter on a presentation platform.

FIG. 5 is a flow diagram of an example process 500 for operating a teleprompter on a presentation platform, such as the presentation and communications platform 110. The process 500 may be implemented by the presenter coaching unit 220 and/or the teleprompter unit 225 of the presentation and communications platform 110. In the process 500, the audio and/or visual content of the presentation captured as the presenter is presenting the presentation. The process 500 may be performed substantially in real time during the presentation to provide feedback to the presenter during the presentation and/or on after the presentation on the audio and/or video content of the presenter captured during the presentation. The process 500 may also be used to provide feedback to the presenter on practice presentations performed without an audience.

The process 500 may include an operation 505 of accessing a teleprompter transcript 315 of the presentation. The presenter may generate a teleprompter script as discussed in the preceding examples, and the script may be accessed and displayed on a presentation interface of the presentation and communications platform 110 prior to the presentation being started. The presentation content and the teleprompter script may be displayed to the presenter as shown in FIGS. 3A-3I.

The process 500 may include an operation 510 of capturing presentation content comprising audio content, video content, or both of a presenter presenting the presentation. Audio and/or video content of the presentation may be captured for both live and practice presentations. The audio and/or video content may be reviewed by the presenter after the presentation and may be analyzed by the presenter coaching unit 220 and/or the teleprompter unit 225 of the presentation and communications platform 110 to provide feedback to the presenter to help improve the presentation content, the teleprompter script, and the presenter's presentation skills.

The process 500 may include an operation 515 of analyzing the presentation content to obtain performance feedback, teleprompter transcript feedback, or both. The audio content and/or video content and the teleprompter transcript may be provided to one or more content processing models 230 for analysis. For example, the audio content and/or the video content of the presenter may be analyzed by the language usage detection model 235, language pattern detection model 240, the pose detection model 255, the gesture detection model 260, and/or the emotion detection model 265 to obtain feedback on the performance skills of the presenter during the presentation. Each of the models may identify various issues associated with the presentation that the presenter may wish to address to improve the presentation skills of the inventor. The teleprompter transcript may also be analyzed by one or more of the content processing models 230, such as but not limited to the language usage detection model 235 and the language pattern detection model 240, to identify issues in the text of the teleprompter transcript which may be used to improve the presentation.

The process 500 may include an operation 520 of annotating the audio content, the video content, the teleprompter transcript, or a combination thereof with the performance feedback, transcript feedback, or both to obtain annotated content. In some implementations, the presenter coaching unit 220 and/or the teleprompter unit 225 may generate performance feedback based on the presentation content that has been analyzed. The performance feedback may be presented to a user in the form of a report or presentation summary, which may be generated and provided to the presenter at the end of the presentation. In other implementations, the presenter coaching unit 220 and/or the teleprompter unit 225 may create annotation indicators that may be added to metadata of the audio content and/or video content. The annotation indicator may identify a portion of the audio content and/or video content for which the performance feedback is being provided. The presentation user interface of the presentation and communications platform 110 may display the annotation indication with the audio content and/or video content. For example, the presentation user interface may present a progress bar or slider element that may be used to indicate a current portion of the audio content or video content being presented and may permit the presenter to select a particular portion of the audio content or video content to be presented. The annotation indications may be displayed on along the progress bar or slider element at a position representing the portion of the audio content or video content associated with the annotation indicator.

The presenter may click on an annotation indicator, hover a pointer over on the annotation indicator, or otherwise activate an annotation indicator to cause the presentation user interface to display details of the performance recommendation, such as the issue detected and how the presenter may correct that issue to improve their presentation skills. Annotation indicators may also be added to the teleprompter transcript and displayed on the presentation interface. The presentation information may be configured to permit the user to scroll through the teleprompter transcript and click on or otherwise activate annotation indicator to cause the presentation user interface to display details of the performance recommendation. The annotation indicators may also provide recommendations for how the user may correct the audio content, video content, and/or the teleprompter transcript as will be discussed in detail below. FIGS. 3G and 3H show two examples which a pacing related recommendation has been provided to the user. In the example shown in FIG. 3G, the pacing recommendation 330 is shown below the presentation controls 305, which may be used to control the playback of the audio content or video content captured for the presentation. FIG. 3H shows another possible configuration of the presentation user interface in which the pacing recommendation 335 is provided proximate to the presentation content pane 310. Other configurations are also possible. For example, the annotations indicators may be added as tic marks or other indicators on the slider control that permits the presenter to select a particular portion of the audio content or video content for playback and provides an indication of a current portion of the audio content or video content being played.

Figure 3E:
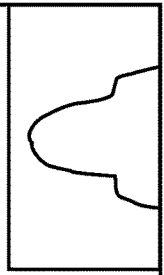
Figure 3I:
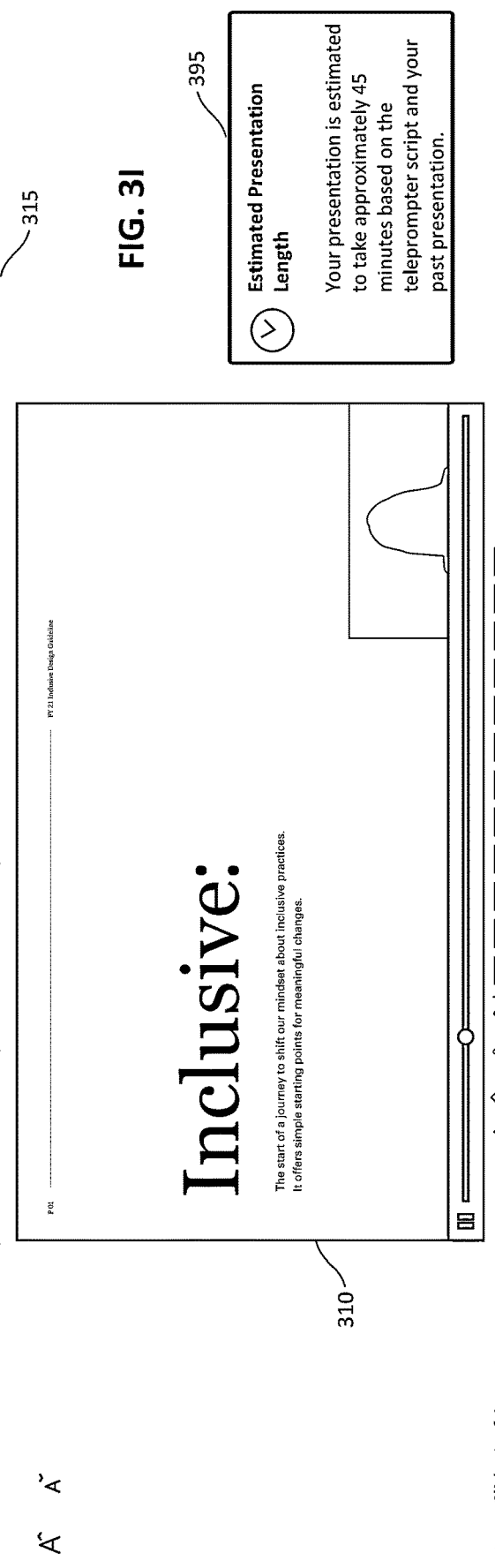

FIG. 3I shows an example of the presentation interface in which the estimated presentation length based on the teleprompter transcript and information obtained from previous practice sessions and presentations by the presenter. The teleprompter unit 225 may provide the text of the teleprompter script 315 to the presentation time prediction model 280 for analysis. The prediction may be presented as an estimated presentation length notification 395, which may be shown on the presentation interface. The estimated presentation length may be revised in response to changes to the text of the teleprompter script 315.

The process 500 may include an operation 525 of presenting the annotated content and one or more suggested changes associated with the annotated content to the presenter. The presentation interface may display the annotations to the audio content, video content, and/or teleprompter transcript of the presentation as discussed above. The annotations may be added to the presentation in substantially real-time as the presentation is underway or may be added after the presentation has been completed. The presenter may wish to view the presentation recommendations in substantially real-time while the user is practicing a presentation. However, adding annotation indicators to the presentation in substantially real-time during a live presentation may be distracting. Therefore, the presentation interface may include a control means that enables the presenter to select between substantially real-time and post presentation feedback.

The process 500 may include an operation 530 of receiving one or more inputs from the presenter to approve or reject the one or more suggested changes. The presenter may record presentation audio and/or video content and make the content available to users who could not participate at the time that the presentation was originally made or would like to review the presentation content later. To the end, the presentation interface may provide recommendations to the user for correcting or clipping out issues in the presentation. For example, the use of filler words or long pauses in the presentation may distract participants from the presentation content. Such issues may be flagged with annotation indicators, and the presentation interface may provide an option to cut the pause or filler word from the recorded audio and/or video content to improve the flow of the presentation. Similarly, the use of inappropriate or potentially offensive language may also be flagged with annotation indicators, and the presentation interface may provide an option to cut the pause or filler word from the recorded audio and/or video content to remove the potentially offensive content. The edited audio and/or video content may be processed to smooth out any potential discontinuities in the edited audio and/or video content so that the audio and/or video content appears as seamless as possible to the users listening to or viewing the edited content.

The presentation interface may also provide means for editing teleprompter transcript. The presentation interface may recommend the removal of inappropriate or potentially offensive language from the teleprompter transcript. The presentation interface may also suggest alternative language that may be more clear or concise than the language originally added by the presenter.

The process 500 may include an operation 535 of editing the annotated content based on the input received from the presenter. The presenter may reject or approve each of the suggested changes. For the changes that were accepted by the presenter, the audio content, video content, and/or the teleprompter transcript may be automatically edited for each of the accepted changes. The presentation and communications platform 110 may be configured to provide version control for the audio content, video content, and the transcript to permit the presenter to refer back to and/or revert back to previous versions of this content that have been automatically edited by the presentation and communications platform 110.

FIG. 6 is a flow diagram of an example process 600 for operating a teleprompter on a presentation platform, such as the presentation and communications platform 110. The process 600 may be implemented by the teleprompter unit 225, which may be configured to automatically analyze the presenter's speech and to scroll the teleprompter text to the appropriate portion of the teleprompter transcript. This process provides a technical benefit over current teleprompters which may be configured to automatically scroll at a predetermined rate or require the presenter to manually scroll through the teleprompter script as the presenter progresses through the presentation. The process 600 advantageously uses natural language processing models to analyze the presenter's speech, to highlight a current section of the teleprompter transcript which the presenter is currently reading, and to automatically scroll to a next section of the teleprompter transcript as the user reaches the end of the current section of the teleprompter transcript.

The process 600 may include an operation 605 of accessing a teleprompter transcript 315 of the presentation and displaying the teleprompter script on a display of a computing device of the associated with the presenter. The presenter may generate a teleprompter script as discussed in the preceding examples, and the script may be accessed and displayed on a presentation interface of the presentation and communications platform 110 prior to the presentation being started. The presentation content and the teleprompter script may be displayed to the presenter as shown in FIGS. 3A-3I.

The process 600 may include an operation 610 of receiving an indication to begin the presentation. of receiving an indication to begin the presentation. The presentation user interface of the presentation and communications platform 110 may provide a button, menu selection, or other means for the user to initiate the presentation. If the presentation includes a local audience, the presentation content on a display be displayed to the live audience using via a display screen, a projector, or other means for displaying the presentation content. If the presentation includes remote participants, the presentation content may be transmitted to the respective client devices 105 of the participants via one or more media streams. Audio and/or video content of the presenter may be captured by the client device 105 of the presenter and streamed to the presentation and communications platform 110, and the presentation and communications platform 110 may then transmit one or more media streams including the presentation content and the audiovisual content of the presenter to the respective client devices 105 of the remote participants.

The process 600 may include an operation 615 of receiving audio content of the presentation including speech of a presenter of the presentation in which the presenter is reading the teleprompter transcript. The client device 105 of the presenter may capture audio and/or video of presenter during the presentation. The presenter may read from the teleprompter transcript shown on the display of the client device 105 of the presenter.

The process 600 may include an operation 620 of analyzing the audio content of the presentation using a first machine learning model to obtain a real-time textual representation of the audio content. The first machine learning model may be implemented by the voice-to-text model 275 shown in FIG. 2. As discussed in the preceding examples, the presentation and communications platform 110 permits the user to capture audio and/or video of the presentation. The audio content and/or video content may be provided as an input to a first machine learning model of the content processing models 230, such as the voice-to-text model 275. The first machine learning model is configured to process the audio and/or video input sufficiently in substantially real time, such that any processing delays introduced by the first machine learning model are sufficiently small that the teleprompter unit 225 may keep the scrolling of the teleprompter script aligned with the presenter's progress through the teleprompter script.

The process 600 may include an operation 625 of analyzing the real-time textual representation and the teleprompter transcript with a second machine learning model to obtain transcript position information. The second machine learning model may be implemented by the text scrolling model 250 shown in FIG. 2. The second machine learning model may be trained to make a prediction of the position within the transcript that the presenter is currently speaking based on the real-time textual representation obtained from the first machine learning model and the teleprompter transcript. The second machine learning model may output a current position within the teleprompter transcript that the presenter is currently reading. The second machine learning model may output a character position or word position within the teleprompter script that indicates where the presenter is currently predicted to be reading. If the second machine learning model cannot find a match, the model may output the previous position where the presenter was predicted to be reading. For example, the presenter may deviate from the teleprompter script to answer a question from the audience or may provide additional details regarding a particular topic before returning to the script.

The process 600 may include an operation 630 of automatically scrolling the teleprompter transcript based on the transcript position information on a display of a computing device associated with the presenter. The presentation interface of the presentation and communications platform 110 may present the transcript so that the presenter may read the transcript and view the presentation content being shown to the participants of the presentation for live presentations. The teleprompter unit 225 may be configured to automatically scroll the text of the teleprompter transcript as the presenter reads the text. FIGS. 3E and 3F show an example of in which the teleprompter text is automatically scrolled as the user moves from one section to the next section of the teleprompter text. In the example shown in FIGS. 3E and 3F, the current line of text 325 which the presenter is predicted to be currently reading is highlighted. However, in other implementations, other segments of the text may be highlighted. For example, the current sentence, bullet point, list item, or other segment of the text may be highlighted so that the presenter may keep track of their current position in the teleprompter text.

The presenter may deviate from the teleprompter text as discussed above. In such instances, the presenter may return to the teleprompter script and the teleprompter unit 225 may continue highlighting and scrolling through the text of teleprompter transcript. The teleprompter unit 225 may provide an indication proximate to or on the teleprompter script 315 that indicates that the auto-scrolling feature has been paused due to a mismatch between the teleprompter script 315 and the presenter's speech. The presenter may manually scroll further along the teleprompter transcript if desired, and the auto-scrolling feature may be automatically reengaged once the presenter's speech synchronizes with the teleprompter transcript.

Figure 7:
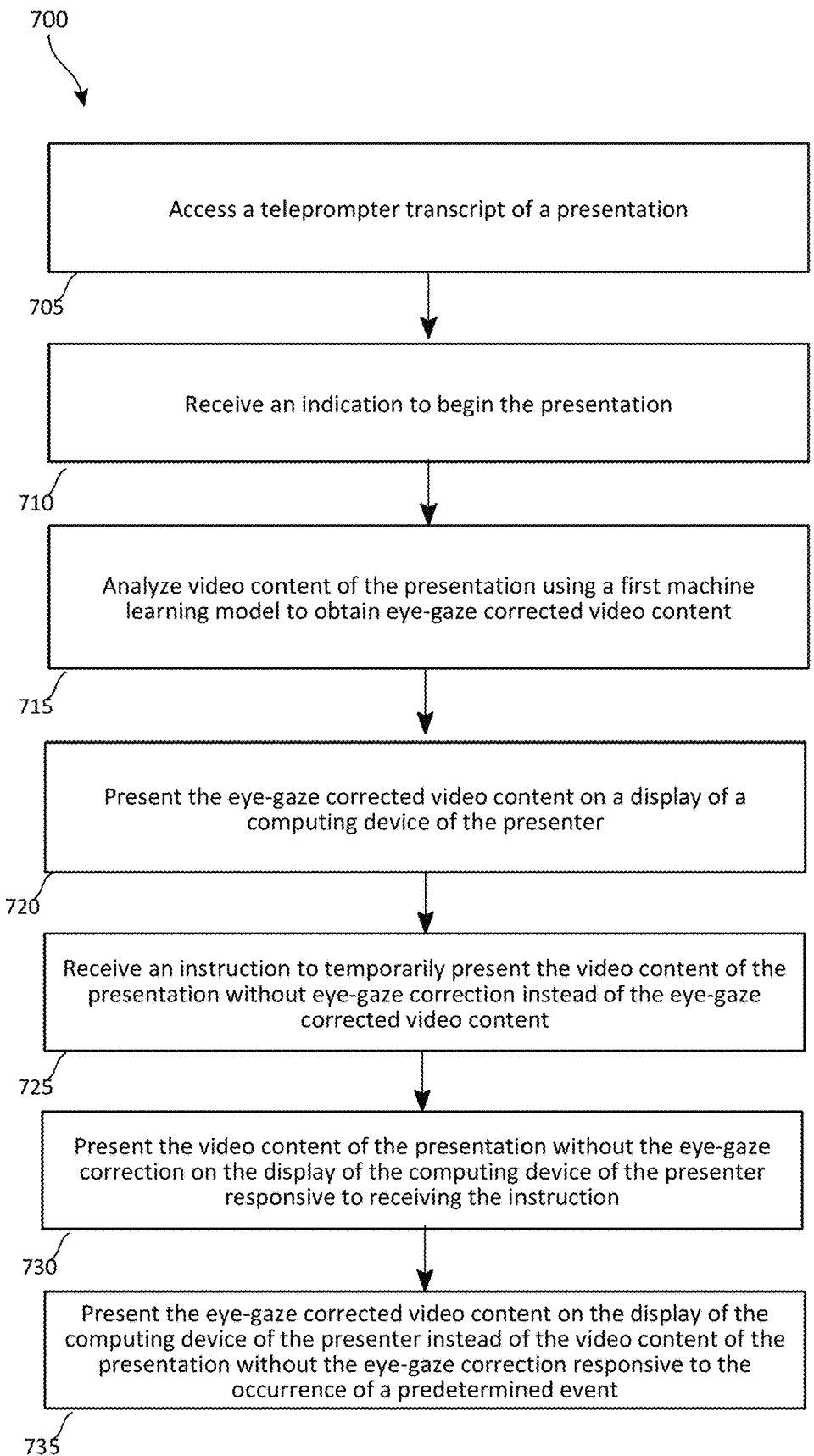
FIG. 7 is a flow diagram of another example process 700 for operating a teleprompter on a presentation platform.

FIG. 7 is a flow diagram of an example process 700 for operating a teleprompter on a presentation platform, such as the presentation and communications platform 110. The presentation and communications platform 110 may be configured to provide automatic eye gaze correction of the video content of a presentation. The presentation and communications platform 110 may provide means for the presenter to test the automatic eye gaze correction by providing means for the presenter to temporarily switch on or off the automatic eye gaze correction so that the presenter may view the video content of the presentation with and without the automatic eye correction. While the process 700 is shown testing the automatic eye gaze correction during a presentation, the presentation and communications platform 110 may also allow the user to enable video capture of the presenter and to test the automatic eye gaze correction without initiating a presentation.

The process 700 may include an operation 705 of accessing a teleprompter transcript 315 of the presentation. The presenter may generate a teleprompter script as discussed in the preceding examples, and the script may be accessed and displayed on a presentation interface of the presentation and communications platform 110 prior to the presentation being started. The presentation content and the teleprompter script may be displayed to the presenter as shown in FIGS. 3A-3I.

The process 700 may include an operation 710 of receiving an indication to begin the presentation. of receiving an indication to begin the presentation. The presentation user interface of the presentation and communications platform 110 may provide a button, menu selection, or other means for the user to initiate the presentation. If the presentation includes a local audience, the presentation content on a display be displayed to the live audience using via a display screen, a projector, or other means for displaying the presentation content. If the presentation includes remote participants, the presentation content may be transmitted to the respective client devices 105 of the participants via one or more media streams. Audio and/or video content of the presenter may be captured by the client device 105 of the presenter and streamed to the presentation and communications platform 110, and the presentation and communications platform 110 may then transmit one or more media streams including the presentation content and the audiovisual content of the presenter to the respective client devices 105 of the remote participants.

The process 700 may include an operation 715 of analyzing video content of the presentation using a first machine learning model to obtain eye-gaze corrected video content.

The presentation and communications platform 110 may provide the video content captured by a camera associated with the client device 105 of the presenter as an input to the eye gaze correction model 245. The eye gaze correction model 245 may be trained to identify the location of the presenter's eyes in the video content and determine an eye gaze direction of the presenter. The eye gaze correction model 245 may be configured to edit the video content of the presentation to adjust the eye gaze direction of the user such that the presenter appears to maintain eye contact with the camera of the client device 105 of the presenter.

The process 700 may include an operation 720 of presenting the eye-gaze corrected video content one a display of a computing device of the presenter. The model may output the eye-gaze corrected video content, and the eye-gaze corrected video may be presented on a display of the computing device of the presenter so that the presenter may review the eye-gaze corrected video to determine whether the eye-gaze correction appears acceptable. In some instances, the eye-gaze correction may appear unnatural, and the presenter may wish to review the output of the eye gaze correction model 245 before determining whether to enable or disable the eye gaze correction for the presentation.

The eye-gaze corrected video content may also be shown to participants of a live presentation instead of the video content of the presentation captured by the camera associated with the client device 105 of the presenter. The eye-gaze corrected video may also be recorded to present to viewers of the recorded version of the presentation.

The process 700 may include an operation 725 of receiving an instruction to temporarily present the video content of the presentation without eye-gaze correction instead of the eye-gaze corrected video content. The presentation interface of the presentation and communications platform 110 may be configured to automatically apply the eye-gaze correction to the video content of the presenter. However, the presentation interface of the presentation and communications platform 110 may provide controls that allow the user to temporarily toggle off the eye gaze correction temporarily so that the presenter may see how the originally The process 700 may include an operation 730 of presenting the video content of the presentation on the display of the computing device of the presenter responsive to receiving the instruction. The unaltered video content of the presentation may be presented to the presenter on the presenter's device so that the presenter may compare the eye-gaze corrected video content with the uncorrected video content to determine whether the eye-gaze correction appears acceptable. Some current presentation and streaming provide eye-gaze correction, but do not provide any means for the user to determine whether the eye-gaze correction is appearing correctly to the viewers of the content. The presentation and communications platform 110 provides a technical solution to this problem by allowing the presenter to both see how the eye-gaze corrected video content appears to participants of the presentation viewing the content and to be able to selectively toggle on and off the eye gaze correction so that the presenter may compare the eye-gaze corrected video with the video without the eye-gaze correction.

The process 700 may include an operation 735 of presenting the eye-gaze corrected video content of the display of the computing device of the presenter instead of the video content of the presentation without the eye-gaze correction responsive to the occurrence of a predetermined event. The presentation and communications platform 110 may automatically return to presenting the eye-gaze corrected video in response to the occurrence of a particular event. In some implementations, the event may be the passage of a predetermined amount of time. For example, the presentation and communications platform 110 may automatically return to presenting the eye-gaze corrected video content after 10 seconds. In other implementations, the event may be the user clicking on a button of a keyboard of the client device 105, touching a control on a touchscreen of the client device 105, or input by the presenter to cause the presentation and communications platform 110 to resume presenting the eye-gaze corrected video content.

The presentation interface of the presentation and communications platform 110 may provide an option for the presenter to disable the eye-gaze correction for the duration of the presentation and/or for future presentations if the eye-gaze corrected video content does not appear satisfactory to the presenter. Furthermore, the presentation and communications platform 110 may store the original version of the video content without the eye correction, and the presenter may refer to and/or revert back to the original version of the video content.

The detailed examples of systems, devices, and techniques described in connection with FIGS. 1-7 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
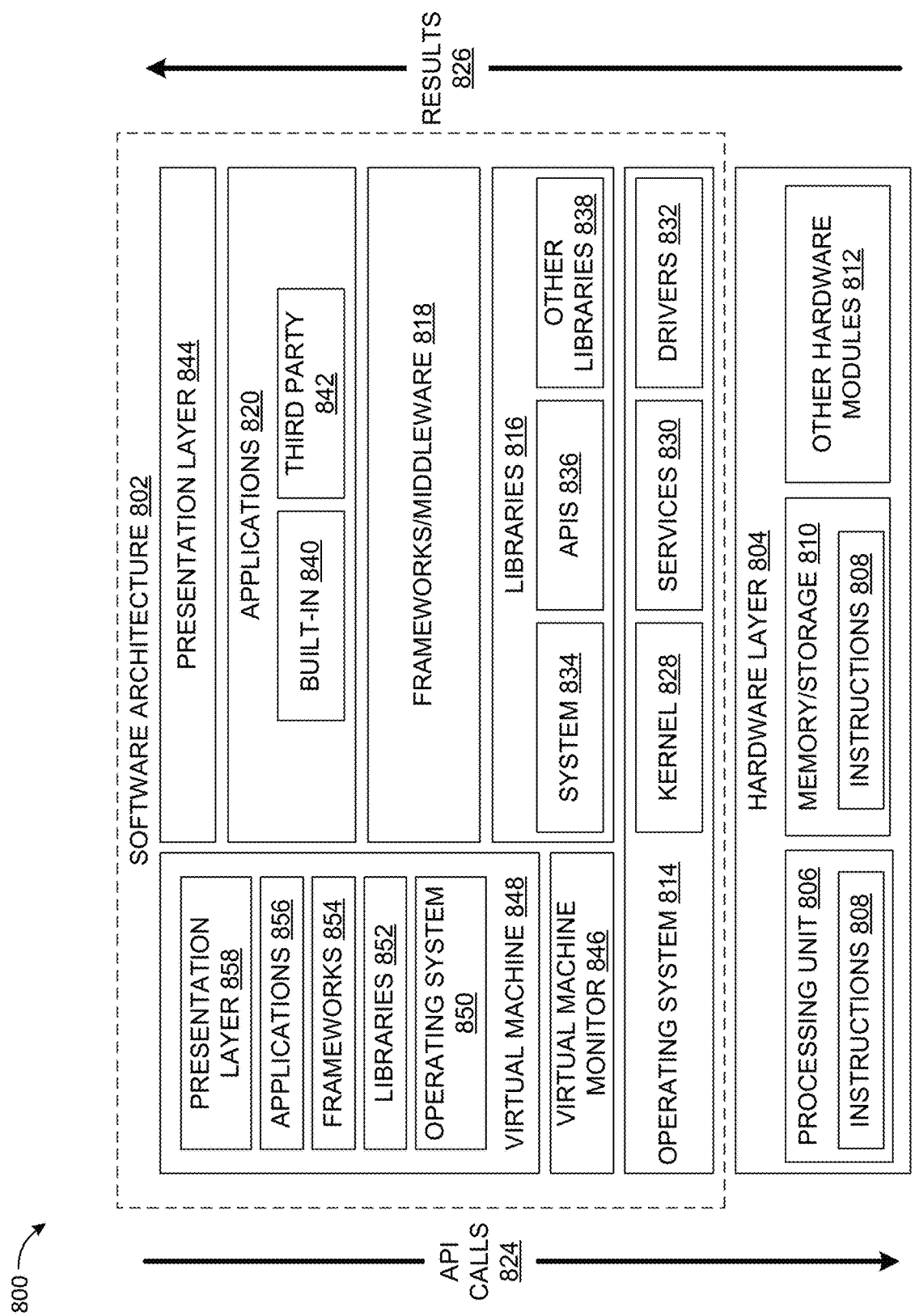
FIG. 8 is a block diagram showing an example software architecture, various portions of which may be used in conjunction with various hardware architectures herein described, which may implement any of the described features.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
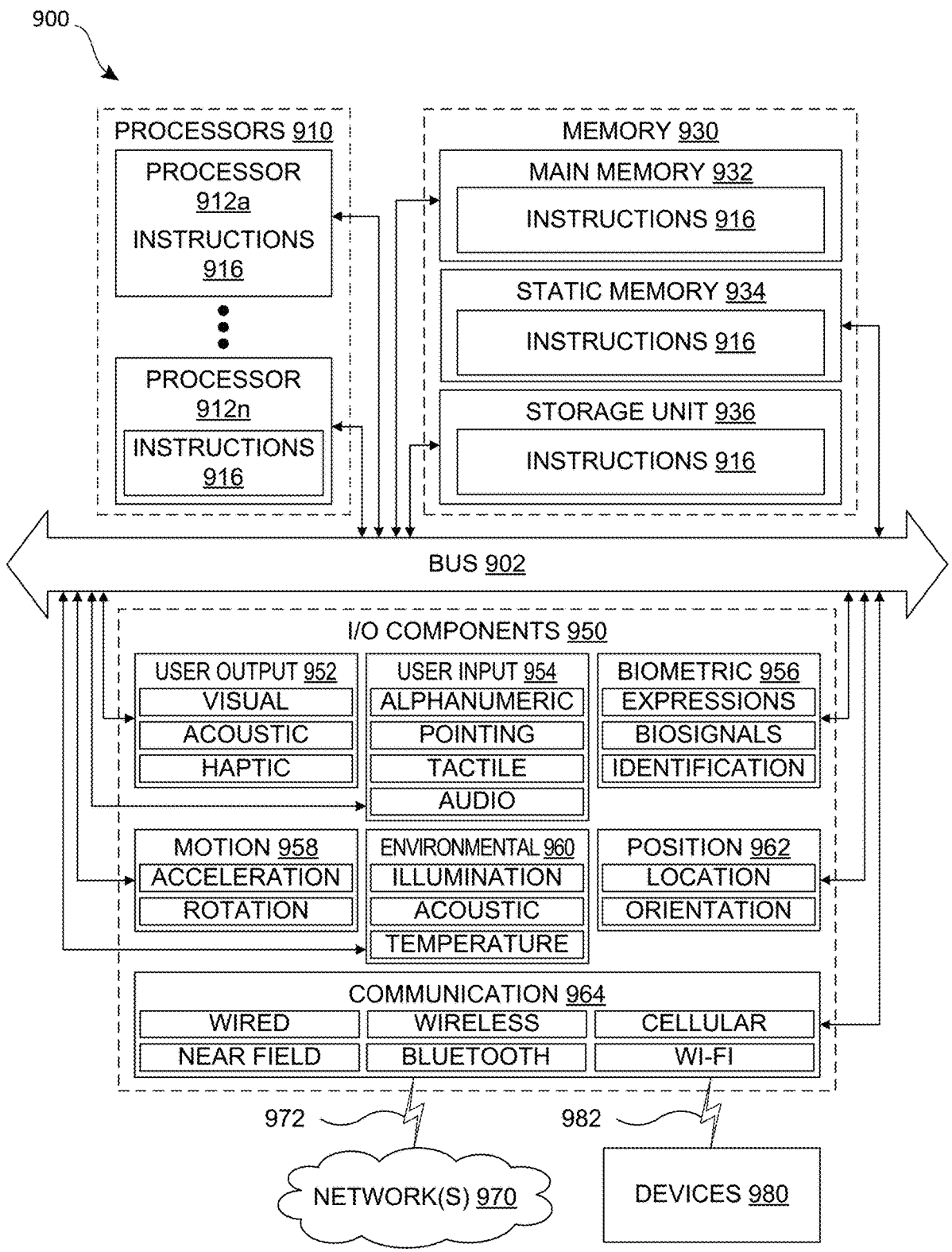
FIG. 9 is a block diagram showing components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 964, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed:

1. A data processing system comprising:
   a processor; and
   a machine-readable medium storing executable instructions that, when executed, cause the processor alone or in combination with one or more other processors to perform operations comprising:
      accessing a teleprompter transcript of a presentation;
      capturing presentation content of a presenter presenting the presentation;
      providing the presentation content and the teleprompter transcript as an input to one or more machine learning models trained to analyze the presentation content and output performance feedback;
      analyzing the presentation content and the teleprompter transcript using the one or more machine learning models;
      obtaining the performance feedback as an output from the one or more machine learning models;
      annotating the presentation content with the performance feedback to obtain annotated content, the performance feedback including suggested changes to the presentation content;
      presenting the annotated content with the performance feedback on a client device associated with the presenter;
      receiving, from the client device of the presenter, input from the presenter approving or rejecting one or more of the suggested changes; and
      automatically editing the annotated content based on the input from the presenter to generate revised presentation content.

2. The data processing system of claim 1, wherein the presentation content includes audio content, video content, or both audio content and video content.

3. The data processing system of claim 2, wherein annotating the presentation content further comprises annotating the presentation content with suggestions for improving the presentation content, presentation skills of the presenter, or both.

4. The data processing system of claim 3, wherein the one or more machine learning models are trained to analyze the teleprompter transcript, and wherein the performance feedback includes suggested changes to the teleprompter transcript.

5. The data processing system of claim 4, wherein the machine-readable medium includes instructions configured to cause the processor to perform operations of annotating the teleprompter transcript with the suggested changes to the teleprompter transcript.

6. The data processing system of claim 2, wherein automatically editing the annotated content further comprises clipping a portion from the annotated content to remove content predicted to be distracting to viewers of the presentation.

7. The data processing system of claim 2, wherein the machine-readable medium includes instructions configured to cause the processor to perform operations of:
   analyzing the video content with a third machine learning model to obtain eye-gaze corrected video content, the third machine learning model being configured to receive the video content, to determine an eye-gaze direction of the presenter, and to modify the video content to adjust the eye-gaze direction to appear that the eye-gaze is directed toward a camera of a computing device of the presenter.

8. A method implemented in a data processing system for by a data processing system for a machine learning driven teleprompter, the method comprising:
   accessing a teleprompter transcript of a presentation;
   capturing presentation content of a presenter presenting the presentation;
   providing the presentation content and the teleprompter transcript as an input to one or more machine learning models trained to analyze the presentation content and output performance feedback;
   analyzing the presentation content and the teleprompter transcript using the one or more machine learning models;
   obtaining the performance feedback as an output from the one or more machine learning models;
   annotating the presentation content with the performance feedback to obtain annotated content, the performance feedback including suggested changes to the presentation content;
   presenting the annotated content with the performance feedback on a client device associated with the presenter;
   receiving, from the client device of the presenter, input from the presenter approving or rejecting one or more of the suggested changes; and
   automatically editing the annotated content based on the input from the presenter to generate revised presentation content.

9. The method of claim 8, wherein the presentation content includes audio content, video content, or both audio content and video content.

10. The method of claim 9, wherein annotating the presentation content further comprises annotating the presentation content with suggestions for improving the presentation content, presentation skills of the presenter, or both.

11. The method of claim 10, wherein the one or more machine learning models are trained to analyze the teleprompter transcript, and wherein the performance feedback includes suggested changes to the teleprompter transcript.

12. The method of claim 11, further comprising annotating the teleprompter transcript with the suggested changes to the teleprompter transcript.

13. The method of claim 9, wherein automatically editing the annotated content further comprises clipping a portion from the annotated content to remove content predicted to be distracting to viewers of the presentation.

14. The method of claim 9, further comprising:
   analyzing the video content with a third machine learning model to obtain eye-gaze corrected video content, the third machine learning model being configured to receive the video content, to determine an eye-gaze direction of the presenter, and to modify the video content to adjust the eye-gaze direction to appear that the eye-gaze is directed toward a camera of a computing device of the presenter.

15. A machine-readable medium on which are stored instructions that, when executed, cause a processor alone or in combination with one or more other processors of a programmable device to perform operations of:
accessing a teleprompter transcript of a presentation;
capturing presentation content of a presenter presenting the presentation;
providing the presentation content and the teleprompter transcript as an input to one or more machine learning models trained to analyze the presentation content and output performance feedback;
analyzing the presentation content and the teleprompter transcript using the one or more machine learning models;
obtaining the performance feedback as an output from the one or more machine learning models;
annotating the presentation content with the performance feedback to obtain annotated content, the performance feedback including suggested changes to the presentation content;
presenting the annotated content with the performance feedback on a client device associated with the presenter;
receiving, from the client device of the presenter, input from the presenter approving or rejecting one or more of the suggested changes; and
automatically editing the annotated content based on the input from the presenter to generate revised presentation content.

16. The machine-readable medium of claim 15, wherein the presentation content includes audio content, video content, or both audio content and video content.

17. The machine-readable medium of claim 16, wherein annotating the presentation content further comprises annotating the presentation content with suggestions for improving the presentation content, presentation skills of the presenter, or both.

18. The machine-readable medium of claim 17, wherein the one or more machine learning models are trained to analyze the teleprompter transcript, and wherein the performance feedback includes suggested changes to the teleprompter transcript.

19. The machine-readable medium of claim 18, wherein the machine-readable medium includes instructions configured to cause the processor to perform operations of annotating the teleprompter transcript with the suggested changes to the teleprompter transcript.

20. The machine-readable medium of claim 16, wherein automatically editing the annotated content further comprises clipping a portion from the annotated content to remove content predicted to be distracting to viewers of the presentation.

* * * * *